(12) United States Patent
Atsumi et al.

(10) Patent No.: US 11,508,091 B2
(45) Date of Patent: Nov. 22, 2022

(54) CALIBRATION DEVICE FOR IMAGING DEVICE, MONITORING DEVICE, WORK MACHINE AND CALIBRATION METHOD

(71) Applicant: Komatsu Ltd., Tokyo (JP)

(72) Inventors: Shogo Atsumi, Tokyo (JP); Taiki Sugawara, Tokyo (JP); Hiroyoshi Yamaguchi, Tokyo (JP); Atsushi Nagato, Tokyo (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 17/059,517

(22) PCT Filed: Jun. 29, 2018

(86) PCT No.: PCT/JP2018/024832
§ 371 (c)(1),
(2) Date: Nov. 30, 2020

(87) PCT Pub. No.: WO2020/003497
PCT Pub. Date: Jan. 2, 2020

(65) Prior Publication Data
US 2021/0209800 A1 Jul. 8, 2021

(51) Int. Cl.
| | |
|---|---|
| *H04N 13/246* | (2018.01) |
| *H04N 13/243* | (2018.01) |
| *G06T 7/80* | (2017.01) |
| *G06T 7/70* | (2017.01) |
| *E02F 9/26* | (2006.01) |
| *E02F 3/32* | (2006.01) |

(52) U.S. Cl.
CPC ............... *G06T 7/85* (2017.01); *E02F 9/262* (2013.01); *G06T 7/70* (2017.01); *H04N 13/243* (2018.05); *H04N 13/246* (2018.05); *E02F 3/32* (2013.01); *G06T 2207/10012* (2013.01); *G06T 2207/30244* (2013.01); *G06T 2207/30252* (2013.01)

(58) Field of Classification Search
CPC ................................ G06T 7/85; H04N 13/246
USPC ............................................................ 348/46
See application file for complete search history.

(56) References Cited

U.S. PATENT DOCUMENTS

| | | | |
|---|---|---|---|
| 2012/0162414 A1 | 6/2012 | Zhang et al. | |
| 2014/0375693 A1 | 12/2014 | Pulla et al. | |
| (Continued) | | | |

FOREIGN PATENT DOCUMENTS

| | | |
|---|---|---|
| CN | 105765963 A | 7/2016 |
| EP | 1637836 A1 | 3/2006 |
| (Continued) | | |

*Primary Examiner* — Amir Shahnami
(74) *Attorney, Agent, or Firm* — Locke Lord LLP

(57) ABSTRACT

A calibration device for an imaging device includes an imaging data acquisition unit that acquires imaging data of a known external target installed at a known position outside a work range of work equipment, the imaging data being obtained by imaging of at least one imaging device provided in a work machine including the work equipment, an external target position acquisition unit that acquires a position of the known external target, and a calibration unit that calibrates the imaging device based on the position of the known external target, which is acquired by the external target position acquisition unit, and the imaging data of the known external target, which is acquired by the imaging data acquisition unit.

15 Claims, 22 Drawing Sheets

(56) References Cited

U.S. PATENT DOCUMENTS

| | | | | |
|---|---|---|---|---|
| 2015/0247301 A1* | 9/2015 | Wighton | ............... | E02F 3/46 |
| | | | | 701/50 |
| 2016/0275683 A1 | 9/2016 | Sakano et al. | | |
| 2017/0089041 A1 | 3/2017 | Kawamoto et al. | | |
| 2017/0284071 A1* | 10/2017 | Yamaguchi | ............ | E02F 9/262 |
| 2017/0320433 A1* | 11/2017 | Zhang | ................... | G06V 20/58 |
| 2019/0208181 A1* | 7/2019 | Rowell | ............. | H04N 5/23238 |

FOREIGN PATENT DOCUMENTS

| | | |
|---|---|---|
| JP | 2004-354257 A | 12/2004 |
| JP | 2014-052335 A | 3/2014 |
| JP | 2015-001465 A | 1/2015 |
| JP | 6966218 B2 | 11/2021 |
| WO | 2012/022231 A1 | 2/2012 |
| WO | 2016/047807 A1 | 3/2016 |
| WO | 2016/148309 A1 | 9/2016 |

* cited by examiner

CALIBRATION DEVICE FOR IMAGING DEVICE, MONITORING DEVICE, WORK MACHINE AND CALIBRATION METHOD

TECHNICAL FIELD

The present invention relates to a calibration device for an imaging device, a monitoring device, a work machine, and a calibration method.

BACKGROUND ART

Patent Literature 1 discloses a technique of calibrating an imaging device in a work machine including work equipment and the imaging device. Specifically, in a calibration system disclosed in Patent Literature 1, the imaging device images a target provided on the work equipment, a positional relation between the imaging device and the target is obtained from the image, and the imaging device is calibrated based on the posture of the work equipment and the positional relation obtained from the image.

CITATION LIST

Patent Literature

[Patent Literature 1]
PCT International Publication No. WO2016/148309

SUMMARY OF INVENTION

Technical Problem

The distance that the work equipment is allowed to be extended from the main body of the work machine is finite. That is, according to the technique disclosed in Patent Literature 1, for an imaging target (construction site and the like before excavation, during excavation, and after excavation) in a work range of the work equipment, it is possible to measure a scale or the like based on the imaging device with high accuracy. The work range refers to a range that which bucket teeth can reach by operating the work equipment. According to the technique disclosed in Patent Literature 1, it is not possible to use position information of a point farther than the work range of the work equipment, in calibration. Thus, when the imaging target is measured based on the imaging device in a region farther than the work range of the work equipment, it is difficult to measure the scale and the like with high accuracy. Thus, it is required to measure the scale and the like at a point farther than the work range of the work equipment with high accuracy.

According to an aspect of the present invention, an object thereof is to provide a calibration device for an imaging device, a work machine, and a calibration method, which are capable of calibrating the imaging device such that it is possible to measure the scale or the like with high accuracy, for an imaging target in a region farther than the work range of the work equipment.

Solution to Problem

A first aspect of the present invention provides a calibration device for an imaging device including: an imaging data acquisition unit that is configured to acquire imaging data of a known external target installed at a known position outside a work range of work equipment, the imaging data being obtained by imaging of at least one imaging device provided in a work machine including the work equipment; an external target position acquisition unit that is configured to acquire a position of the known external target; and a calibration unit that is configured to calibrate the imaging device based on the position of the known external target, which is acquired by the external target position acquisition unit, and the imaging data of the known external target, which is acquired by the imaging data acquisition unit.

Advantageous Effects of Invention

According to the above aspect, it is possible to calibrate an imaging device such that it is possible to perform calculation for an imaging target in a region farther than a work range of work equipment, with high accuracy.

DESCRIPTION OF EMBODIMENTS

<Coordinate System>

Figure 1:
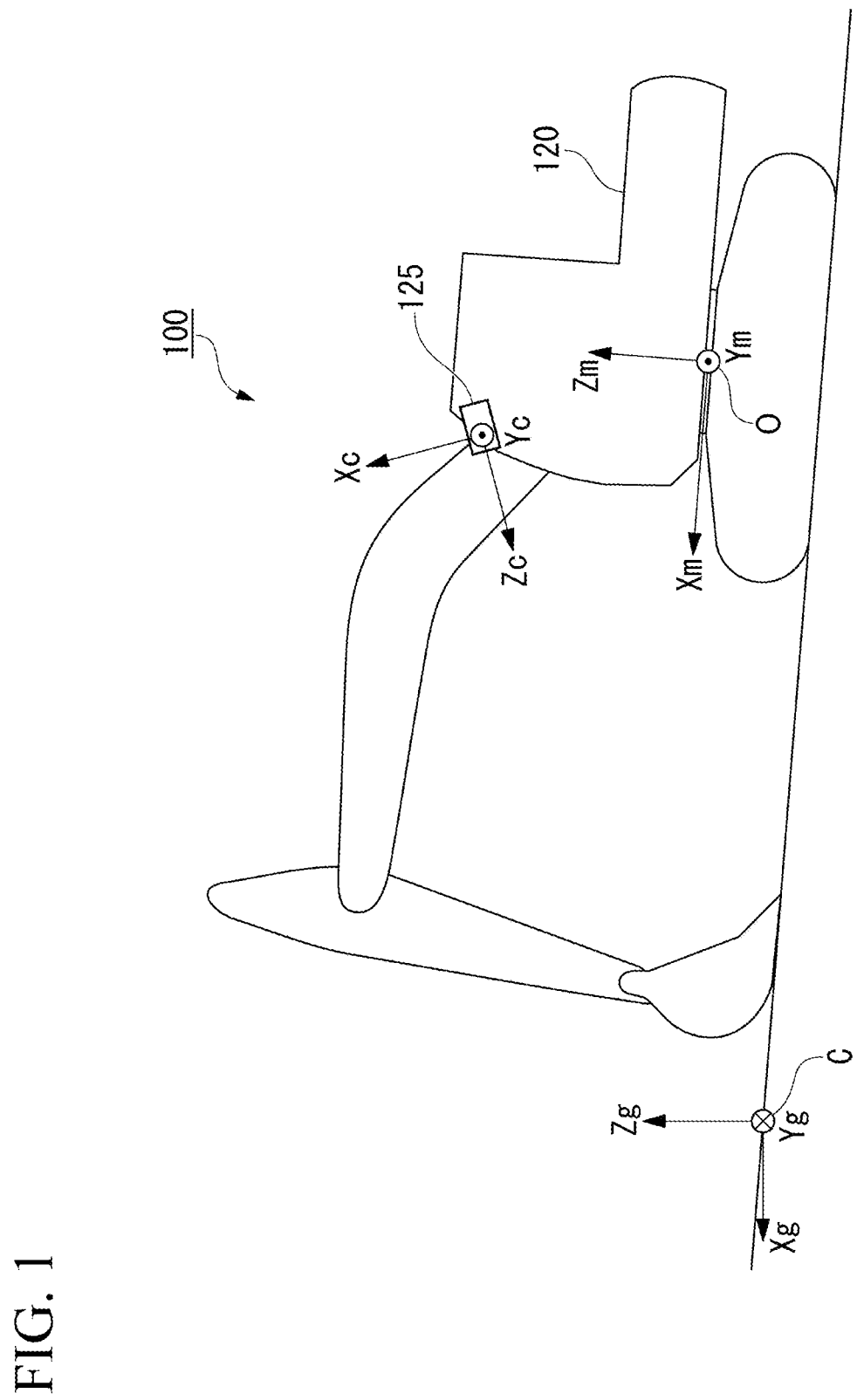
FIG. 1 is a diagram representing a relation between a hydraulic excavator and a coordinate system.

FIG. 1 is a diagram representing a relation between a hydraulic excavator and a coordinate system.

In the following description, a three-dimensional site coordinate system (Xg, Yg, Zg), a three-dimensional vehicle body coordinate system (Xm, Ym, Zm), and a three-dimensional camera coordinate system (Xc, Yc, Zc) are defined, and the positional relation will be described based on the defined coordinate systems.

The site coordinate system is a coordinate system configured by an Xg axis extending north and south, a Yg axis extending east and west, and a Zg axis extending vertically with the position of a GNSS reference station C provided in the construction site as a reference point. An example of GNSS is a global positioning system (GPS). The GNSS reference station C is an example of a site reference point in which the position in the site coordinate system is known.

The vehicle body coordinate system is a coordinate system configured by an Xm axis extending front and rear, a Ym axis extending right and left, and a Zm axis extending vertically with a representative point O defined on a swing body 120 of a hydraulic excavator 100 described later, as a reference. With the representative point O of the swing body 120 as a reference, the front is referred to as a +Xm direction, the rear is referred to as a −Xm direction, the left is referred to as a +Ym direction, the right is referred to as a −Ym direction, an upward direction is referred to as a +Zm direction, and a downward direction is referred to as a −Zm direction.

The camera coordinate system is a coordinate system configured by an Xc axis extending in a vertical direction of a camera, a Yc axis extending in a width direction of the camera, and a Zc axis extending in an optical axis direction of the camera with the position of one camera (for example, first camera 1251) forming a stereo camera 125 of the hydraulic excavator 100 described later, as a reference.

A control device 126 of the hydraulic excavator 100 described later is capable of transforming a position in one coordinate system into a position in another coordinate system by calculation. For example, the control device 126 is capable of transforming a position in the camera coordinate system into a position in the vehicle body coordinate system and is capable of transforming the position in the vehicle body coordinate system into the position in the camera coordinate system. The control device 126 is capable of transforming a position in the site coordinate system into a position in the vehicle body coordinate system and is also capable of transforming the position in the vehicle body coordinate system into the position in the site coordinate system.

First Embodiment

<Structure of Hydraulic Excavator>

Figure 2:
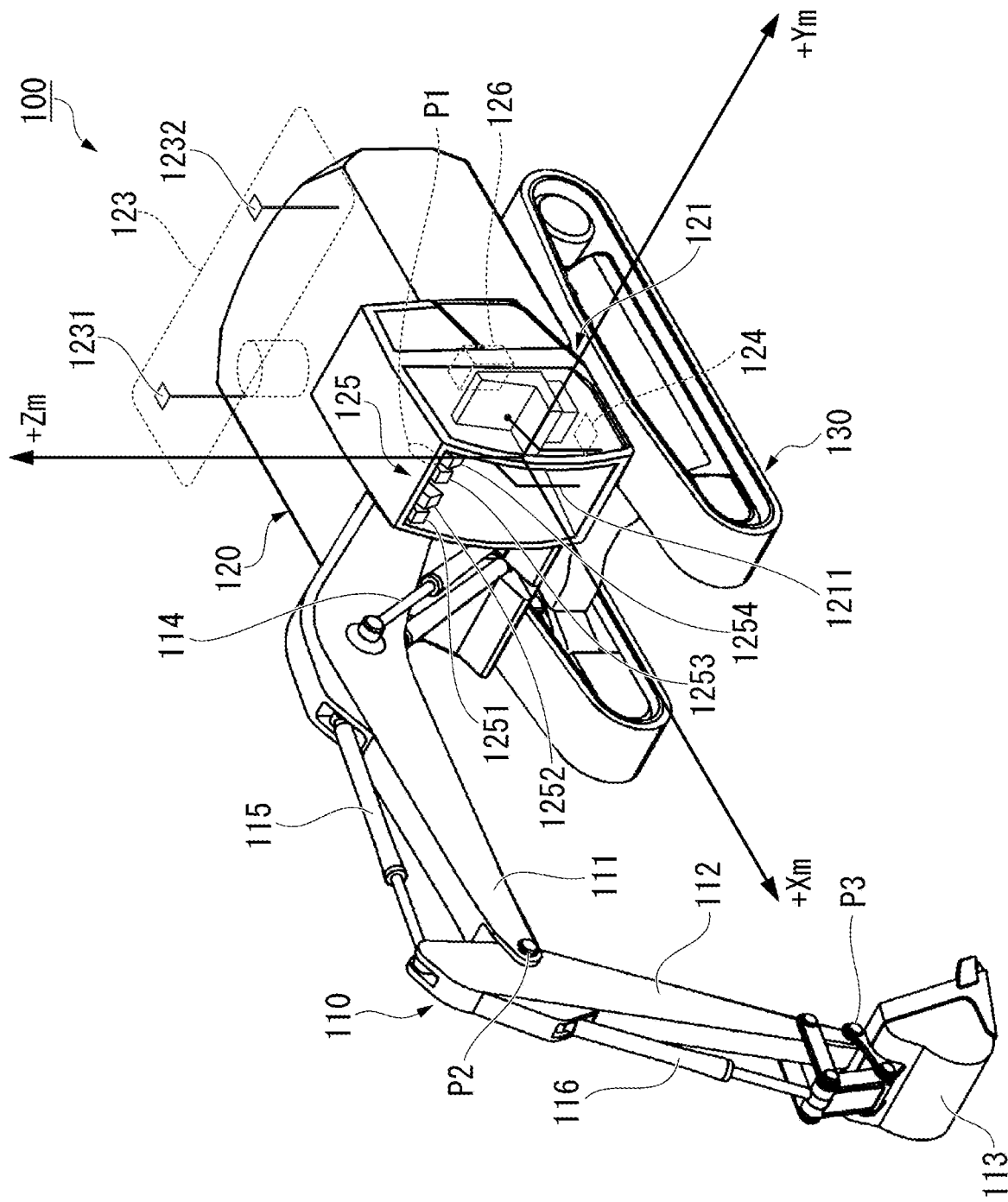
FIG. 2 is a perspective view representing an external appearance of the hydraulic excavator including a calibration system according to a first embodiment.

FIG. 2 is a perspective view representing an external appearance of a hydraulic excavator including a calibration system according to a first embodiment.

The hydraulic excavator 100 being a work machine includes work equipment 110 that is hydraulically operated, a swing body 120 that supports the work equipment 110, and a carriage 130 that supports the swing body 120.

<<Work Equipment of Hydraulic Excavator>>

The work equipment 110 includes a boom 111, an arm 112, a bucket 113, a boom cylinder 114, an arm cylinder 115, and a bucket cylinder 116.

The boom 111 is a column that supports the arm 112 and the bucket 113. The base end portion of the boom 111 is attached to the front portion of the swing body 120 through a boom pin P1.

The arm 112 connects the boom 111 and the bucket 113. The base end portion of the arm 112 is attached to the tip end portion of the boom 111 through an arm pin P2.

The bucket 113 is a container having a blade for excavating earth. The base end portion of the bucket 113 is attached to the tip end portion of the arm 112 through a bucket pin P3.

The boom cylinder 114 is a hydraulic cylinder for operating the boom 111. The base end portion of the boom cylinder 114 is attached to the swing body 120. The tip end portion of the boom cylinder 114 is attached to the boom 111.

The arm cylinder 115 is a hydraulic cylinder for driving the arm 112. The base end portion of the arm cylinder 115 is attached to the boom 111. The tip end portion of the arm cylinder 115 is attached to the arm 112.

The bucket cylinder 116 is a hydraulic cylinder for driving the bucket 113. The base end portion of the bucket cylinder 116 is attached to the arm 112. The tip end portion of the bucket cylinder 116 is attached to the bucket 113.

<<Vehicle Body of Hydraulic Excavator>>

The swing body 120 includes a cab 121 on which an operator rides. The cab 121 is provided in front of the swing body 120 and on the left side (+Ym side) of the work equipment 110.

An operation device 1211 for operating the work equipment 110 is provided in the cab 121. A working oil is supplied to the boom cylinder 114, the arm cylinder 115, and the bucket cylinder 116 in accordance with the operation amount of the operation device 1211, and the work equipment 110 drives.

A stereo camera 125 is provided above the cab 121. The stereo camera 125 is installed in the front (+Xm direction) and an upper part (+Zm direction) in the cab 121. The stereo camera 125 images the front (+Xm direction) of the cab 121 through a windshield on the front of the cab 121. The stereo camera 125 includes at least one pair of cameras. In the first embodiment, the stereo camera 125 includes two pairs of cameras, and therefore the stereo camera 125 includes four cameras. Specifically, the stereo camera 125 includes a first camera 1251, a second camera 1252, a third camera 1253, and a fourth camera 1254 in order from the right side (−Ym side). Examples of each camera include cameras using a charge coupled device (CCD) sensor and a complementary metal oxide semiconductor (CMOS) sensor.

The first camera 1251 and the third camera 1253 are paired cameras. The first camera 1251 and the third camera 1253 are installed to be spaced in a left-right direction (±Ym direction) such that optical axes of the cameras are substantially parallel to the floor surface of the cab 121. The second camera 1252 and the fourth camera 1254 are paired cameras. The second camera 1252 and the fourth camera 1254 are installed to be spaced in the left-right direction (±Ym direction) such that optical axes of the cameras are substantially parallel to each other and are tilted in a downward direction (−Zm direction) of the front (+Xm direction) of the cab 121 with respect to the floor surface of the cab 121.

The stereo camera 125, the first camera 1251, the second camera 1252, the third camera 1253, and the fourth camera 1254 are an example of an imaging device. A distance between the stereo camera 125 and an imaging target can be calculated by using the pair of pieces of imaging data obtained by imaging of at least one pair of cameras in the stereo camera 125. In another embodiment, the stereo camera 125 may be configured by one pair of cameras, or three or more pairs of cameras. In still another embodiment, instead of the stereo camera 125, a sensor, for example, a time of flight (TOF) camera, that obtains both an image and a distance image representing three-dimensional data may be used as the imaging device. A camera capable of obtaining a distance image may be used as the imaging device.

<<Control System of Hydraulic Excavator>>

Figure 3:
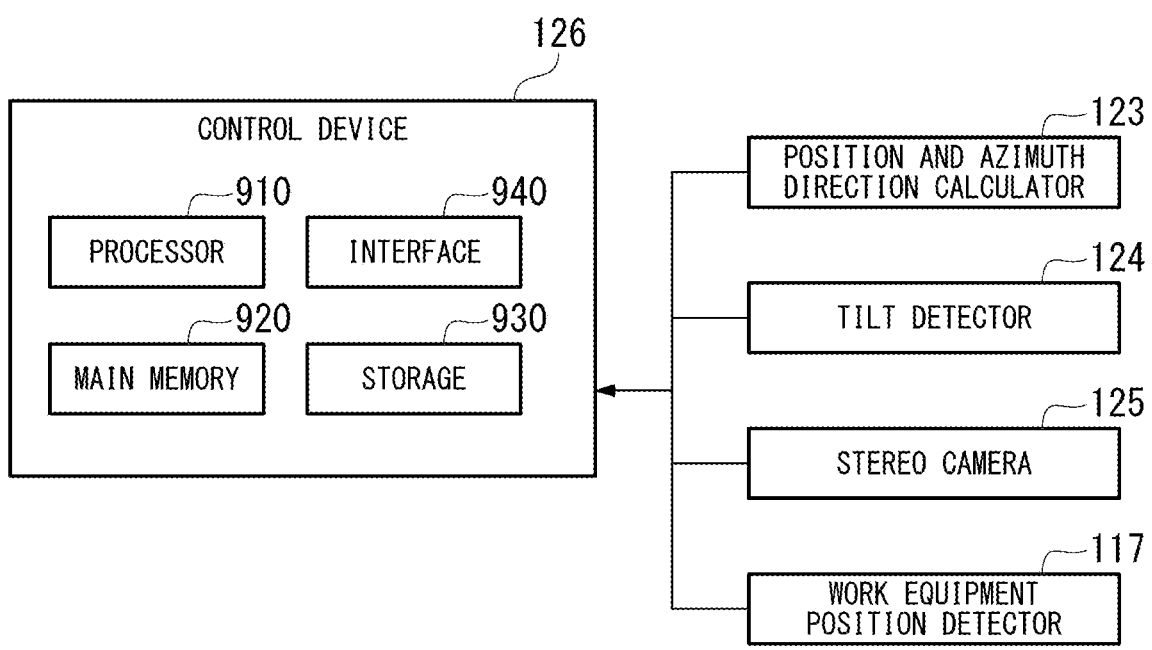
FIG. 3 is a schematic block diagram representing a configuration of a control system of the hydraulic excavator according to the first embodiment.

FIG. 3 is a schematic block diagram representing a configuration of a control system of the hydraulic excavator according to the first embodiment.

The hydraulic excavator 100 includes a work equipment position detector 117, a position and azimuth direction calculator 123, a tilt detector 124, the stereo camera 125, and the control device 126.

The work equipment position detector 117 detects the posture angle of the work equipment 110. The work equipment position detector 117 according to the first embodiment is a stroke detector that detects the stroke length of each of the boom cylinder 114, the arm cylinder 115, and the bucket cylinder 116. Thus, the control device 126 described later can detect the posture angle of the work equipment 110 based on the stroke length of each of the boom cylinder 114, the arm cylinder 115, and the bucket cylinder 116. In another embodiment, the configuration of the hydraulic excavator is not limited thereto. As the work equipment position detector 117, an angle detector such as a rotary encoder or a leveler may be used instead of the stroke detector or in combination with the stroke detector.

The position and azimuth direction calculator 123 calculates the position of the swing body 120 and the azimuth direction in which the swing body 120 is directed. The position and azimuth direction calculator 123 includes a first receiver 1231 and a second receiver 1232 that receive positioning signals from artificial satellites that form a global navigation satellite system (GNSS). The first receiver 1231 and the second receiver 1232 are installed at different positions of the swing body 120. The position and azimuth direction calculator 123 detects the position of the representative point O (origin of the vehicle body coordinate system) of the swing body 120 in the site coordinate system based on the positioning signal received by the first receiver 1231.

The position and azimuth direction calculator 123 uses the positioning signal received by the first receiver 1231 and the positioning signal received by the second receiver 1232 to calculate the azimuth direction of the swing body 120 as a relation of the installation position of the second receiver 1232 with the detected installation position of the first receiver 1231.

The tilt detector 124 measures the acceleration and the angular velocity of the swing body 120 and detects the tilt of the swing body 120 (for example, a roll representing rotation about the Xm axis, a pitch representing rotation about the Ym axis, and a yaw representing rotation about the Zm axis) based on the measurement result. The tilt detector 124 is installed, for example, on the lower surface of the cab 121. As the tilt detector 124, for example, an inertial measurement unit (IMU) being an inertial measurement device can be used.

The control device 126 includes a processor 910, a main memory 920, a storage 930, and an interface 940.

The storage 930 stores a program for controlling the work equipment 110. Examples of the storage 930 include a hard disk drive (HDD) and a non-volatile memory. The storage 930 may be an internal medium which is directly connected to a bus of the control device 126, or may be an external medium which is connected to the control device 126 through an interface 940 or a communication line.

The processor 910 reads out the program from the storage 930, expands the program in the main memory 920, and executes the process in accordance with the program. The processor 910 secures a storage region in the main memory 920 in accordance with the program. The interface 940 is connected to the work equipment position detector 117, the operation device 1211, the position and azimuth direction calculator 123, the tilt detector 124, the stereo camera 125, and other peripheral devices to transmit and receive signals.

The control device 126 measures an imaging target such as a construction site based on a captured image obtained by imaging of the stereo camera 125, by executing the program. The control device 126 generates three-dimensional data representing the shape of the imaging target from imaging data obtained by imaging of the stereo camera. Examples of the three-dimensional data include point cloud data, polygon data, and voxel data. The control device 126 generates three-dimensional data in the camera coordinate system configured by the Xc axis, the Yc axis, and the Zc axis which are orthogonal to each other with the position of the stereo camera 125 as a reference. The control device 126 performs calculation for calibration (external calibration and vehicle body calibration) of the stereo camera 125 by executing the program. The external calibration is to obtain the positions and the postures of the pair of cameras that form the stereo camera 125. The vehicle body calibration is to obtain the positional relation between the stereo camera 125 and the swing body 120. That is, the control device 126 is an example of a calibration device for an imaging device.

<<Posture of Work Equipment>>

Figure 4:
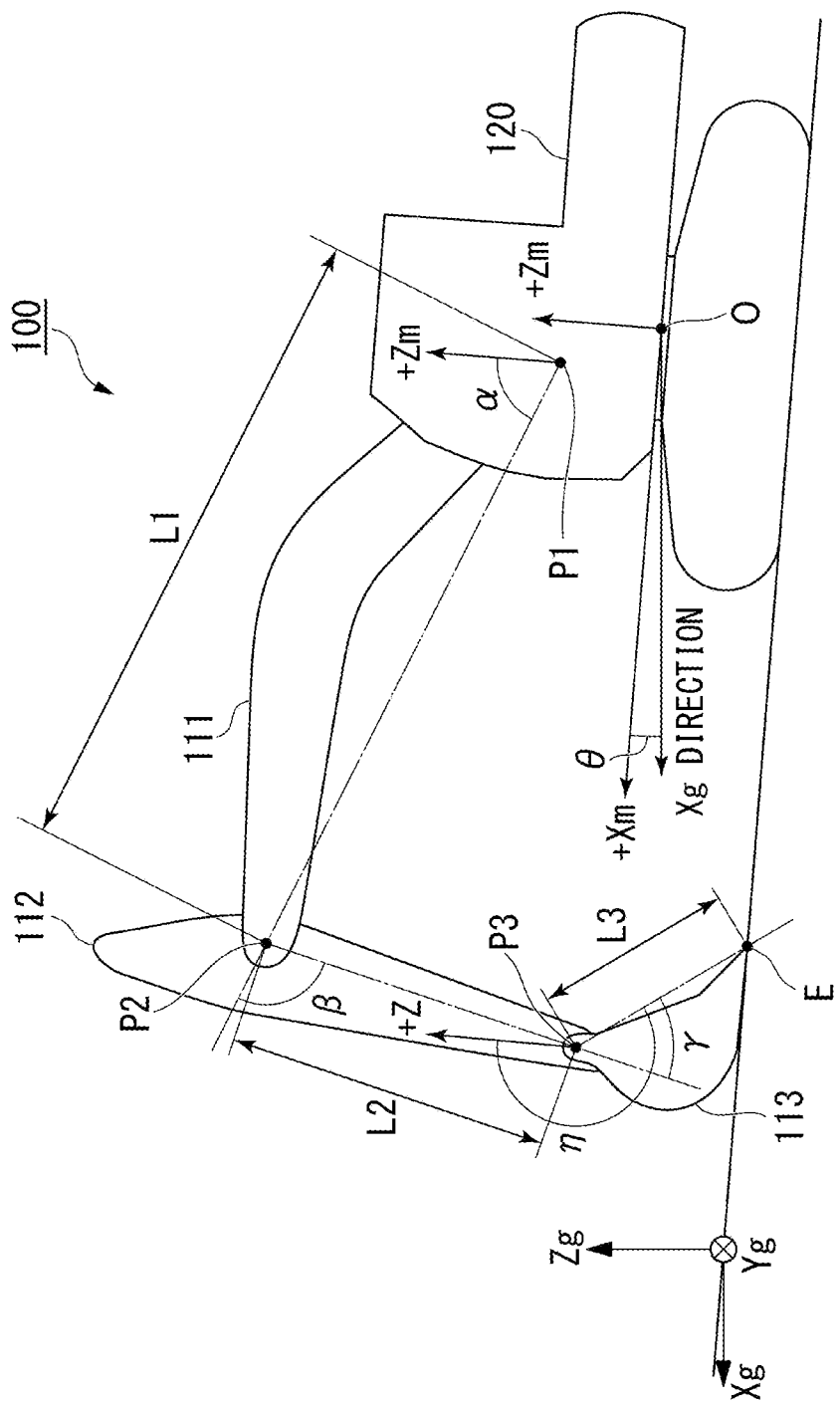
FIG. 4 is a diagram representing an example of a posture of work equipment.

FIG. 4 is a diagram representing an example of the posture of the work equipment. The control device 126 calculates the posture of the work equipment 110 based on the detection result of the work equipment position detector 117. Specifically, the control device 126 calculates the posture angle α of the boom 111, the posture angle β of the arm 112, the posture angle α of the bucket 113, and the position of the teeth E of the bucket 113, as the posture of the work equipment 110.

The posture angle α of the boom 111 is represented by an angle formed by a half line extending from the boom pin P1 in an upward direction (+Zm direction) of the swing body 120 and a half line extending from the boom pin P1 to the arm pin P2. Depending on the tilt (pitch angle) θ of the swing body 120, the upward direction of the swing body 120 and a vertically upward direction do not necessarily coincide with each other. The posture angle β of the arm 112 is represented by an angle formed by a half line extending from the boom pin P1 to the arm pin P2 and a half line extending from the arm pin P2 to the bucket pin P3.

The posture angle γ of the bucket 113 is represented by an angle formed by a half line extending from the arm pin P2 to the bucket pin P3 and a half line extending from the bucket pin P3 to the teeth E of the bucket 113.

Here, the sum of the posture angle α of the boom 111, the posture angle β of the arm 112, and the posture angle γ of the bucket 113 may be referred to as a posture angle η of the work equipment 110. The posture angle η of the work equipment 110 is equal to an angle formed by a half line extending from the bucket pin P3 in the upward direction (+Z direction) of the swing body 120 and a half line extending from the bucket pin P3 to the teeth E of the bucket 113.

The position of the teeth E of the bucket 113 in the vehicle body coordinate system is obtained from the size L1 of the boom 111, the size L2 of the arm 112, the size L3 of the bucket 113, the posture angle α of the boom 111, the posture angle β of the arm 112, and the posture angle γ of the bucket 113, the position of the representative point O of the swing body 120, and the positional relation between the representative point O and the boom pin P1. The size L1 of the boom 111 is the distance from the boom pin P1 to the arm pin P2. The size L2 of the arm 112 is the distance from the arm pin P2 to the bucket pin P3. The size L3 of the bucket 113 is the distance from the bucket pin P3 to the teeth E. The positional relation between the representative point O and the boom pin P1 is represented, for example, by the position of the boom pin P1 in the vehicle body coordinate system with the representative point O as a reference. The positional relation between the representative point O and the boom pin P1 may be represented, for example, by the distance from the representative point O to the boom pin P1, the tilt of a half line extending from the representative point O to the boom pin P1 in the Xm-axis direction, and the tilt in the Ym-axis direction.

<<Calibration of Stereo Camera>>

The posture relation between one pair of cameras (first camera 1251 and third camera 1253, or second camera 1252 and fourth camera 1254) in the stereo camera 125 in the camera coordinate system can be represented by Expression (1).

$$Pc1 = Rcy \cdot Rcp \cdot Rcr \cdot Pc3 + Tc \qquad (1)$$

Here, Pc1 indicates the position of the first camera 1251 in the camera coordinate system, and Pc3 indicates the position of the third camera 1253 in the camera coordinate system. Rcy indicates a rotation matrix for transforming the yaw angle of the third camera 1253 into the yaw angle of the first camera 1251. Rcp indicates a rotation matrix for transforming the pitch angle of the third camera 1253 into the pitch angle of the first camera 1251. Rcr indicates a rotation matrix for transforming the roll angle of the third camera 1253 into the roll angle of the first camera 1251. Tc is a translation matrix for transforming the position Pc3 into the position Pc1.

When the elements of each matrix in Expression (1) are stated, Expression (2) is obtained.

$$\begin{pmatrix} x_1 \\ y_1 \\ z_1 \end{pmatrix} = \begin{pmatrix} \cos\theta_y & \sin\theta_y & 0 \\ -\sin\theta_y & \cos\theta_y & 0 \\ 0 & 0 & 1 \end{pmatrix} \qquad (2)$$

-continued
$$\begin{pmatrix} \cos\theta_p & 0 & -\sin\theta_p \\ 0 & 1 & 0 \\ \sin\theta_p & 0 & \cos\theta_p \end{pmatrix} \begin{pmatrix} 1 & 0 & 0 \\ 0 & \cos\theta_r & \sin\theta_r \\ 0 & -\sin\theta_r & \cos\theta_r \end{pmatrix} \begin{pmatrix} x_3 \\ y_3 \\ z_3 \end{pmatrix} + \begin{pmatrix} Tx \\ Ty \\ Tz \end{pmatrix}$$

Here, x1 indicates the position of the first camera 1251 in the Xc coordinate of the camera coordinate system. y1 indicates the position of the first camera 1251 in the Yc coordinate of the camera coordinate system. z1 indicates the position of the first camera 1251 in the Zc coordinate of the camera coordinate system. x3 indicates the position of the third camera 1253 in the Xc coordinate of the camera coordinate system. y3 indicates the position of the third camera 1253 in the Yc coordinate of the camera coordinate system. z3 indicates the position of the third camera 1253 in the Zc coordinate of the camera coordinate system. θy indicates a relative angle (yaw angle) of the third camera 1253 about the Xc axis to the first camera 1251. θp indicates a relative angle (pitch angle) of the third camera 1253 around the Yc axis to the first camera 1251. θr indicates a relative angle (roll angle) of the third camera 1253 around the Zc axis to the first camera 1251. Tx indicates the relative position of the third camera 1253 in the Xc axis direction to the first camera 1251. Ty indicates the relative position of the third camera 1253 in the Yc axis direction to the first camera 1251. Tz indicates the relative position of the third camera 1253 in the Zc axis direction to the first camera 1251.

In the above description, Expressions (1) and (2) are described using the pair of the first camera 1251 and the third camera 1253 as an example. However, the above description is similarly applied to the posture relation between the pair of the second camera 1252 and the fourth camera 1254.

In calibration according to the first embodiment, the matrices Rcy, Rcp, Rcr, and Tc forming Expression (1) are obtained. That is, in the calibration according to the first embodiment, the parameters θy, θp, θr, Tx, Ty, and Tz forming Expression (2) are obtained.

The positional relation between each camera (first camera 1251, second camera 1252, third camera 1253, or fourth camera 1254) in the stereo camera 125 and the swing body 120 can be represented by Expression (3).

$$Pm1 = Rmy \cdot Rmp \cdot Rmr \cdot Pc1 + Tm \qquad (3)$$

Here, Pc1 indicates the position of the first camera 1251 in the camera coordinate system. Rmy is a rotation matrix for transforming the yaw angle (angle around the Xc axis) of the first camera 1251 in the camera coordinate system into the yaw angle (angle around the Xm axis) in the vehicle body coordinate system. Rmp is a rotation matrix for transforming the pitch angle (the angle around the Yc axis) of the first camera 1251 in the camera coordinate system into the pitch angle (the angle around the Ym axis) in the vehicle body coordinate system. Rmr is a rotation matrix for transforming the roll angle (angle around the Zc axis) of the first camera 1251 in the camera coordinate system into the roll angle (angle around the Zm axis) in the vehicle body coordinate system. Tm is a translation matrix for transforming the position Pc1 into the position Pm1. The matrices Rmy, Rmp, Rmr, and Tm are vehicle body parameters and are parameters indicating the position and posture information of each camera and the swing body 120. In the above description, Expression (3) is described using the first camera 1251 as an example. However, the above description is similarly applied to the second camera 1252, the third camera 1253, and the fourth camera 1254. That is, an expression representing the positional relation between each of the first camera 1251, the second camera 1252, the third camera 1253, and the fourth camera 1254 and the swing body 120 can be represented by applying Expression (3) to each camera.

In calibration according to the first embodiment, the matrices Rmy, Rmp, Rmr, and Tm forming Expression (3) are obtained. When the matrices are obtained, the control device 126 can transform the position in the camera coordinate system into the position in the vehicle body coordinate system.

The control device 126 in the hydraulic excavator 100 according to the first embodiment calibrates the stereo camera 125 by the stereo camera 125 imaging a work equipment target Tm and an external target Tg. The work equipment target Tm refers to a figure attached to the work equipment 110 that is clearly shown in the captured image of the stereo camera 125. The external target Tg refers to a figure provided in the construction site that is clearly shown in the captured image of the stereo camera 125. The work equipment target Tm and the external target Tg according to the first embodiment mean, for example, that black dots are marked on a white board. With such a figure, the contrast becomes clear in the captured image, and thus it is possible to reliably specify the positions of the work equipment target Tm and the external target Tg.

Figure 5:
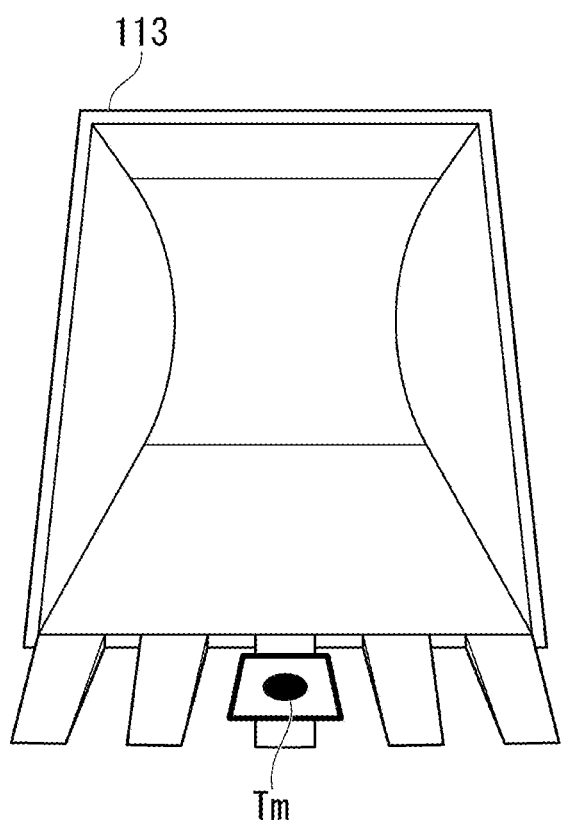
FIG. 5 is a diagram representing an example of a work equipment target used for performing a calibration method according to the first embodiment.

FIG. 5 is a diagram representing an example of the work equipment target used for performing a calibration method according to the first embodiment.

The work equipment target Tm is attached to a predetermined position on the blade of the bucket 113. In the first embodiment, the work equipment target Tm is attached to the central blade among the blades of the bucket 113. The position of the teeth of the central blade of the bucket 113 in the vehicle body coordinate system can be calculated by the calculation of the control device 126. Thus, if the positional relation between the teeth of the bucket 113 and the center position of the work equipment target Tm is known, the control device 126 can accurately calculate the center position of the work equipment target Tm attached to the central blade. In another embodiment, the work equipment target Tm may be attached to a plurality of blades, for example, to the total three blades including a central blade and blades at both left and right ends. In still another embodiment, the work equipment target Tm may be attached to a place other than the blade of the bucket 113 so long as the place is at a position on the work equipment 110, at which each camera of the stereo camera 125 is allowed to perform imaging. For example, the work equipment target Tm may be attached to the tip of a rod-shaped attachment attached to the work equipment. The position information of the work equipment target Tm calculated by the calculation of the control device 126 includes an error of the GNSS and other errors. The accuracy of the position information of the work equipment target Tm calculated by the calculation of the control device 126 is higher than the accuracy of the parameters of the stereo camera 125 before calibration. Therefore, in this embodiment, the position information of the work equipment target Tm is used for the parameter calibration of the stereo camera 125. The work equipment target Tm in which the center position is known is an example of a known point target located in the work range.

Here, the work equipment target Tm is attached to the blade in the center of the bucket 113.

Figure 6:
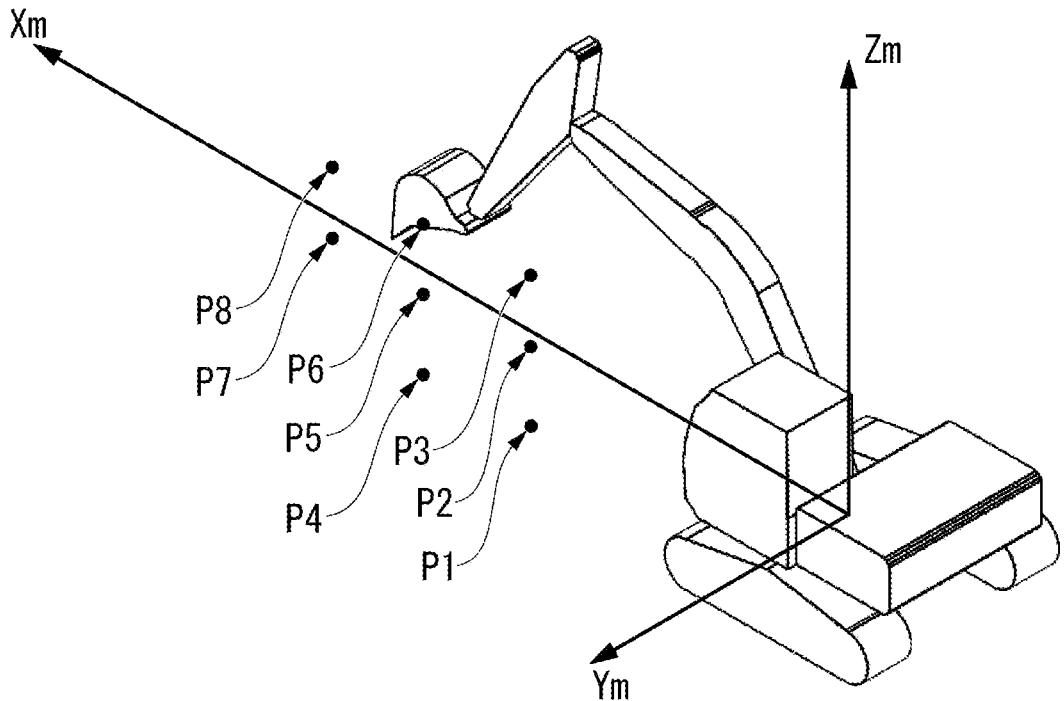
FIG. 6 is a diagram representing a position of a work equipment target imaged by a stereo camera in the first embodiment.

FIG. 6 is a diagram representing the position of the work equipment target imaged by a stereo camera in the first embodiment.

When the stereo camera 125 is calibrated, the operator of the hydraulic excavator 100 controls the work equipment 110 such that the work equipment targets Tm comes to, for example, the positions p1, p2, p3, p4, p5, p6, p7, and p8 represented in FIG. 6. Each camera which forms the stereo camera 125 images the work equipment target Tm at each position. At this time, the control device 126 acquires information indicating the position of the work equipment from the work equipment position detector 117 when the stereo camera 125 performs imaging.

The positions p1 to p8 are not necessarily the positions represented in FIG. 6. The operator of the hydraulic excavator 100 may move the work equipment target Tm to any position and then perform imaging. The number of positions of the work equipment target Tm is not necessarily eight, but any plural points may be provided.

Figure 7:
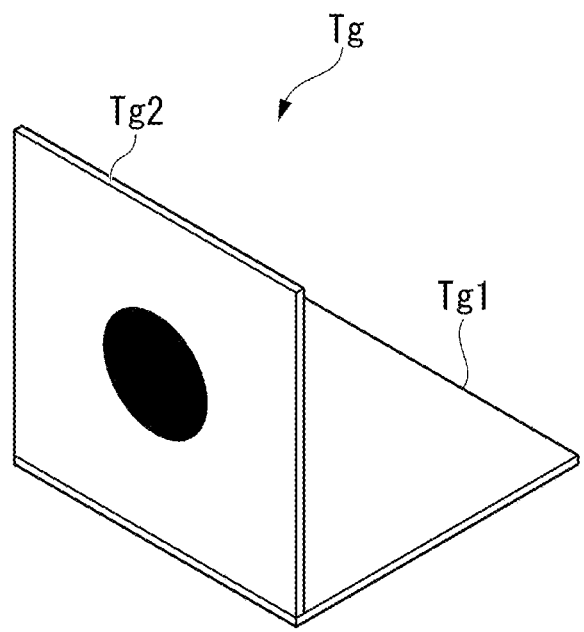
FIG. 7 is a diagram representing an example of an external target used for performing the calibration method according to the first embodiment.

FIG. 7 is a diagram representing an example of the external target used for performing the calibration method according to the first embodiment.

As represented in FIG. 7, the external target Tg includes a ground plate Tg1 that faces the ground, and a display plate Tg2 that rises vertically from the ground plate Tg1 and in which a predetermined figure is drawn. The structure of the external target Tg does not necessarily have to include the ground plate Tg1 and the display plate Tg2. The external target Tg may have any configuration so long as the position of the external target Tg can be recognized from the captured image of the stereo camera 125. For example, the external target Tg according to another embodiment may include only the display plate Tg2 and be attached to the ground, a wall, or the like. The external target Tg according to another embodiment does not have to include the display plate Tg2 and may be a figure which is directly drawn on the ground or a wall. The external target Tg does not have to draw a figure on the display plate Tg2. A figure that is drawn on the display plate Tg2 and has any shape, any color, any pattern, and the like may be provided so long as the figure allows recognition of the position. In the calibration according to the first embodiment, the external target Tg is installed at a plurality of any positions on the construction site (that is, a plurality of positions in which the position in the site coordinate system is unknown) and the position in which the position in the site coordinate system is known. A position in which the position in a certain coordinate system is unknown is also referred to as an unknown position below. A position in which the position in a certain coordinate system is known is also referred to as a known point below. The external target Tg disposed at the unknown point is also referred to as an unknown external target, and the external target Tg disposed at the known point is also referred to as a known external target.

Figure 8:
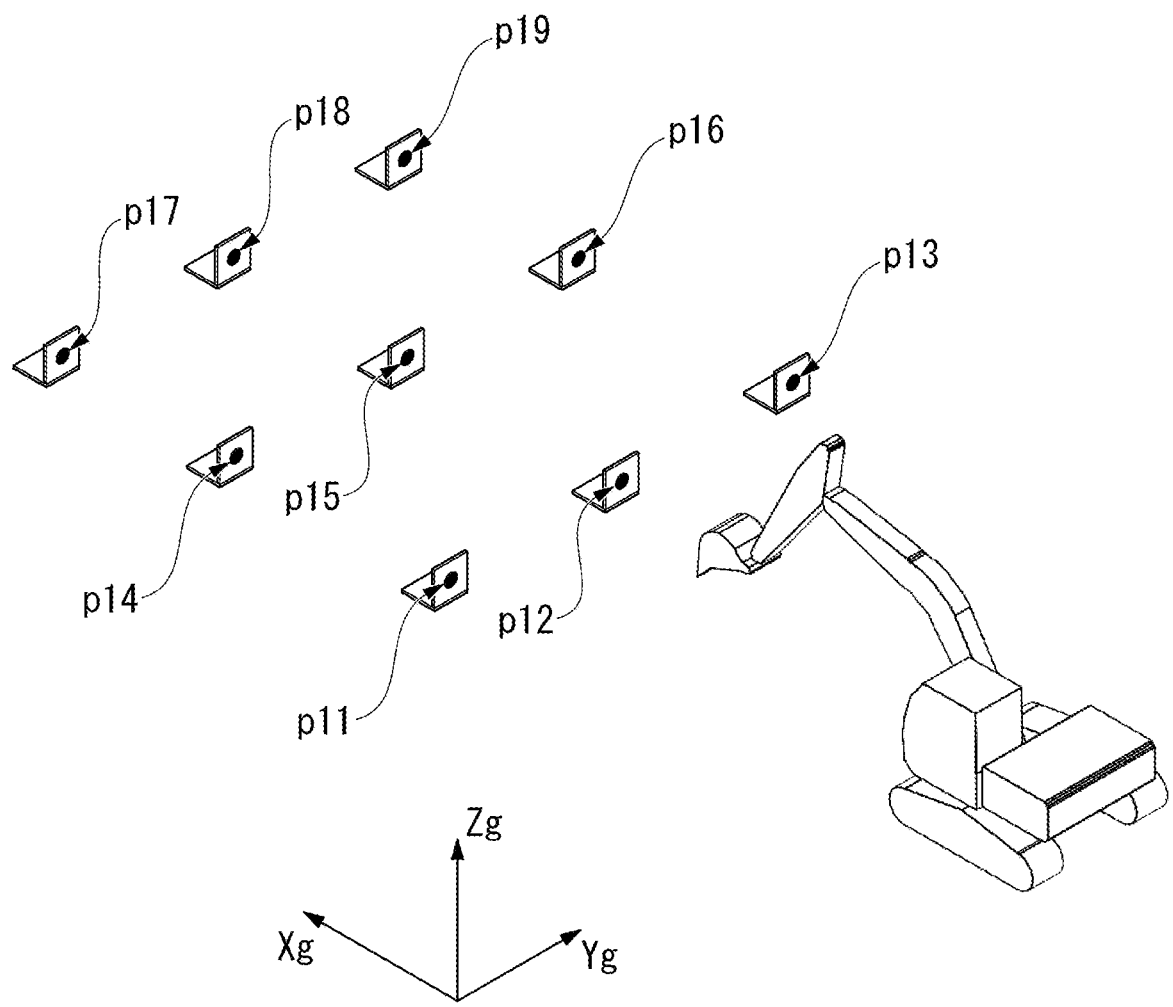
FIG. 8 is a diagram representing a first position of the external target imaged by the stereo camera in the first embodiment.

FIG. 8 is a diagram representing a first position of the external target imaged by the stereo camera in the first embodiment.

When the stereo camera 125 is calibrated, the operator of the hydraulic excavator 100 installs the external target Tg, for example, at positions p11, p12, p13, p14, p15, p16, p17, p18, and p19 represented in FIG. 8. All the positions p11 to p19 are unknown points. That is, the installation position of the external target Tg does not have to be accurate, and the position in the site coordinate system is unknown. The number of external targets Tg is not necessarily nine, and a plurality of unknown points may be provided. At this time, it is preferable that the positions p11 to p19 are disposed to be dispersed in an imaging range of the stereo camera 125.

For each camera, the control device 126 specifies the center position of the work equipment target Tm at the positions p1 to p8 and the center position of the work equipment target Tm in a captured image obtained by imaging the external target Tg at the positions p11 to p19. The center position of the work equipment target Tm in the captured image is an example of imaging data of the work equipment target Tm. The control device 126 obtains the center position of the work equipment target Tm (positions in the vehicle body coordinate system corresponding to the positions p1 to p8) in the vehicle body coordinate system, based on the teeth position of the bucket 113, which is detected by the work equipment position detector 117, the posture angle η of the bucket 113, and the positional relation between the center of the work equipment target Tm and the teeth. Then, the control device 126 performs a convergence calculation using the positions in the captured image of each camera for the positions p1 to p8 and p11 to p19 and the position in the vehicle body coordinate system corresponding to the positions p1 to p8, and thereby obtaining the parameters of each camera. Specifically, the control device 126 can obtain the matrices Rmy, Rmp, Rmr, and Tm forming Expression (3) for each camera by the convergence calculation, and thereby obtaining the matrices Rcy, Rcp, Rcr, and Tc forming Expression (1).

In another embodiment, the control device 126 may perform a convergence calculation using the positions in the captured image of each camera for the positions p1 to p8 and positions in the vehicle body coordinate system for the positions p1 to p8 and convergence calculation using the positions in the captured image of each camera for the positions p11 to p19, and thereby obtaining the parameters of each camera. The control device 126 may perform convergence calculations in parallel.

Here, the control device 126 can perform a convergence calculation using the positions in the captured image of each camera for the positions p1 to p8 and the positions in the vehicle body coordinate system for the positions p1 to p8, and thereby obtaining the parameters of the camera such that the accuracy of stereo measurement is secured in a range surrounded by at least the positions p1 to p8. The control device 126 can perform a convergence calculation using the positions in the captured image of each camera for the positions p11 to p19, and thereby obtaining the parameters of the camera such that the establishment of stereo measurement is secured in a range surrounded by the positions p11 to p19. Since the positions in the vehicle body coordinate system for the positions p11 to p19 are unclear, the accuracy of stereo measurement in a range surrounded by the positions p11 to p19 is not secured. That is, regarding any position in the range surrounded by the positions p11 to p19, it is possible to calculate the distance by stereo measurement, but the accuracy of the distance may be low. In another embodiment, the control device 126 may perform a convergence calculation without using the positions of the unknown points (positions p11 to p19).

Therefore, the control device 126 obtains the parameters of each camera by the above procedure, and then further adjusts the parameters of each camera by using the captured image of the external target Tg in which the position is known. In this manner, the accuracy of the distance in a range outside the range surrounded by the positions p1 to p8 is improved.

Figure 9:
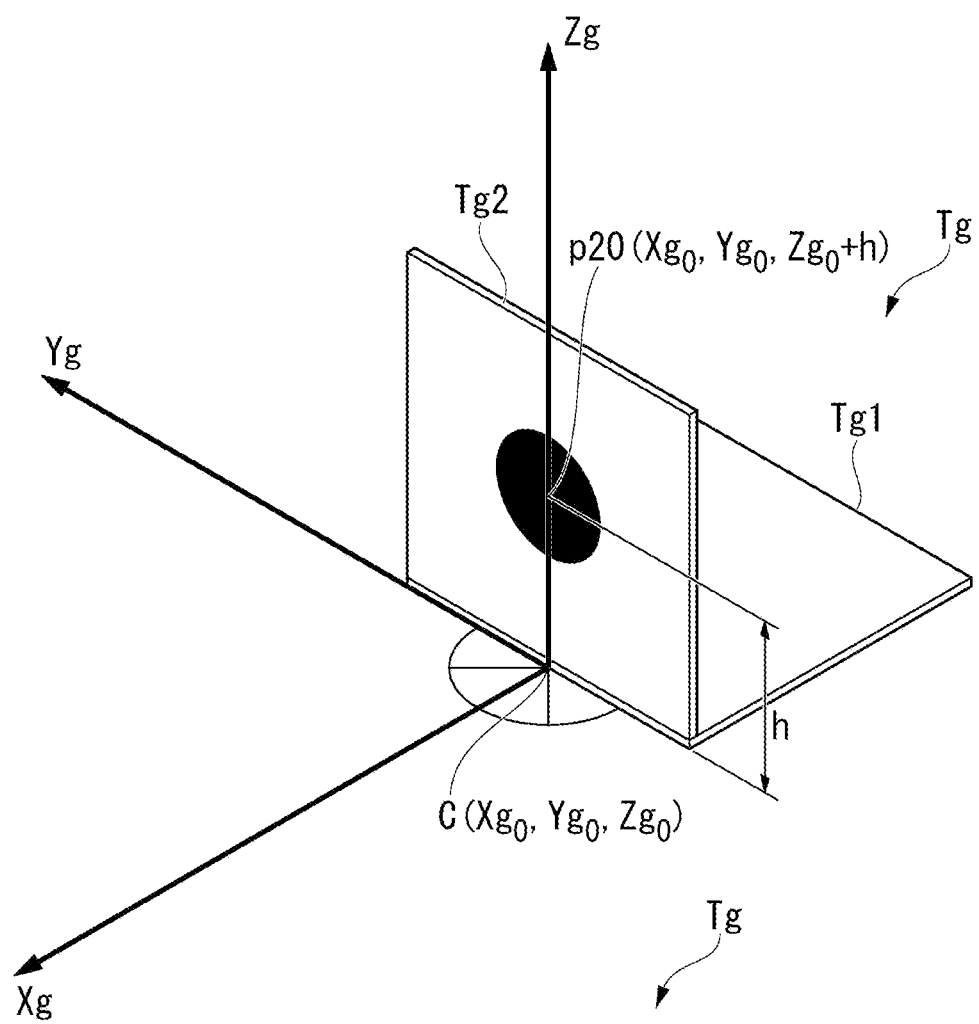
FIG. 9 is a diagram representing a procedure for installing the external target in the first embodiment.

FIG. 9 is a diagram representing a procedure for installing the external target in the first embodiment.

In the first embodiment, the parameters of each camera are adjusted in a manner that the external target Tg is disposed at a position p20 (known point) in which the position in the site coordinate system is known and is imaged. In the first embodiment, the external target Tg is installed at the construction site such that the center of the GNSS reference station C is located immediately below the figure drawn on the display plate Tg2, for example. The position (Xg0, Yg0, Zg0) of the GNSS reference station C in the site coordinate system is known, and the distance h from the bottom surface of the ground plate Tg1 of the external target Tg to the center point of the figure drawn on the display plate Tg2 is known. Thus, the center position p20 (Xg0, Yg0, Zg0+h) of the figure of the external target Tg in the site coordinate system can be accurately specified. In another embodiment, the GNSS reference station C is not necessarily the reference point (origin) in the site coordinate system. Since the position information of the known external target Tg is measured by using a highly accurate sensor such as a total station, the accuracy is higher than the accuracy of the parameters of the stereo camera 125 before calibration. Therefore, in this embodiment, it is possible to improve the accuracy of stereo measurement by using the position information of the external target Tg for parameter calibration of the stereo camera 125.

Figure 10:
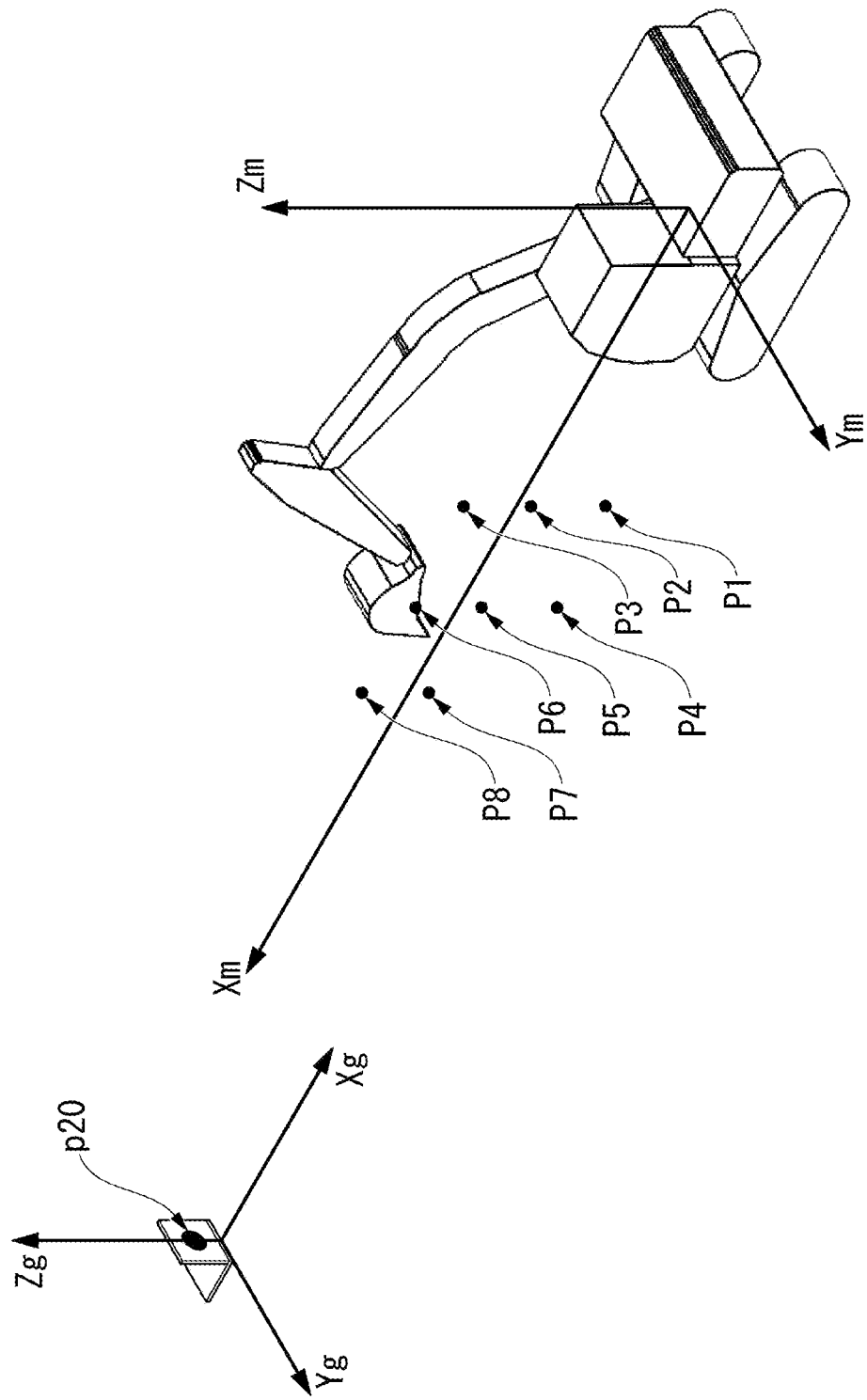
FIG. 10 is a diagram representing a second position of the external target imaged by the stereo camera in the first embodiment.

FIG. 10 is a diagram representing a second position of the external target imaged by the stereo camera in the first embodiment.

The operator of the hydraulic excavator 100 performs the calibration using the work equipment target Tm and the external target Tg being an unknown point, and then moves the hydraulic excavator 100 such that the external target Tg being the known point installed at the position p20 is farther than the work range (range surrounded by p1 to p8) of the work equipment 110. The work range refers to a range in which the teeth E of the bucket 113 can reach by operating the work equipment 110, in the vehicle body coordinate system. Each camera forming the stereo camera 125 images the external target Tg at the position p20. In the example represented in FIG. 10, the stereo camera 125 images the known external target Tg in which the position in the site coordinate system is known, once. However, the embodiment is not limited thereto. The control device 126 may cause the stereo camera 125 to image the known external target Tg in which the position in the site coordinate system is known, a plurality of times for each relative position while changing the relative position between the stereo camera 125 and the known external target Tg in which the position in the site coordinate system is known. In this case, it is possible to obtain the parameters of the stereo camera 125 with higher accuracy than the accuracy in a case where the external target Tg in which the position in the site coordinate system is known is imaged once. The external target Tg being a known point installed outside the work range is an example of a known point target located outside the work range. The external target Tg being a known point installed in the work range is an example of a known point target located in the work range.

The control device 126 calculates the center position of the external target Tg in the camera coordinate system by stereo measurement based on the captured image obtained by imaging the external target Tg at the position p20. Then, the control device 126 transforms the calculated center position into the center position (first position) of the external target Tg in the vehicle body coordinate system, based on the parameters indicating the position and the posture of the stereo camera 125, which are stored in a parameter storage unit 204. The control device 126 performs coordinate transformation of the center position of the external target Tg in the site coordinate system to obtain the center position (second position) of the external target Tg in the vehicle body coordinate system. The control device 126 adjusts the parameters of each camera such that the difference (distance) between the first position and the second position is minimized Since the parameter storage unit 204 stores the parameters indicating the position and the posture of each camera in the vehicle body coordinate system, the positional relation between the camera and the external target Tg is understood by calculating the first position and the second position. That is, the combination of the first position and the parameter stored in the parameter storage unit 204 is an example of a first positional relation which is the positional relation between the camera and the external target Tg. The combination of the second position and the parameter stored in the parameter storage unit 204 is an example of a second positional relation which is the positional relation between the camera and the external target Tg.

In another embodiment, the control device 126 may adjust the parameters of each camera based on the distance between the stereo camera 125 and the external target Tg instead of the center position of the external target Tg in the camera coordinate system. Specifically, the control device 126 may adjust the parameters of the camera in the following procedure. The control device 126 obtains the distance (first distance) between the stereo camera 125 and the center position of the external target Tg by stereo measurement based on the captured image obtained by imaging the external target Tg at the position p20. The control device 126 obtains the distance (second distance) between the stereo camera 125 and the center position of the external target Tg by transformation of the coordinate system based on the center position of the external target Tg in the site coordinate system and the position of the stereo camera 125 in the vehicle body coordinate system. Then, the control device 126 adjusts the parameters of each camera such that the difference between the first distance and the second distance is minimized. All the first distance and the second distance are values that represent the positional relation between the stereo camera 125 and the external target Tg.

<Control Device of Hydraulic Excavator>

Figure 11:
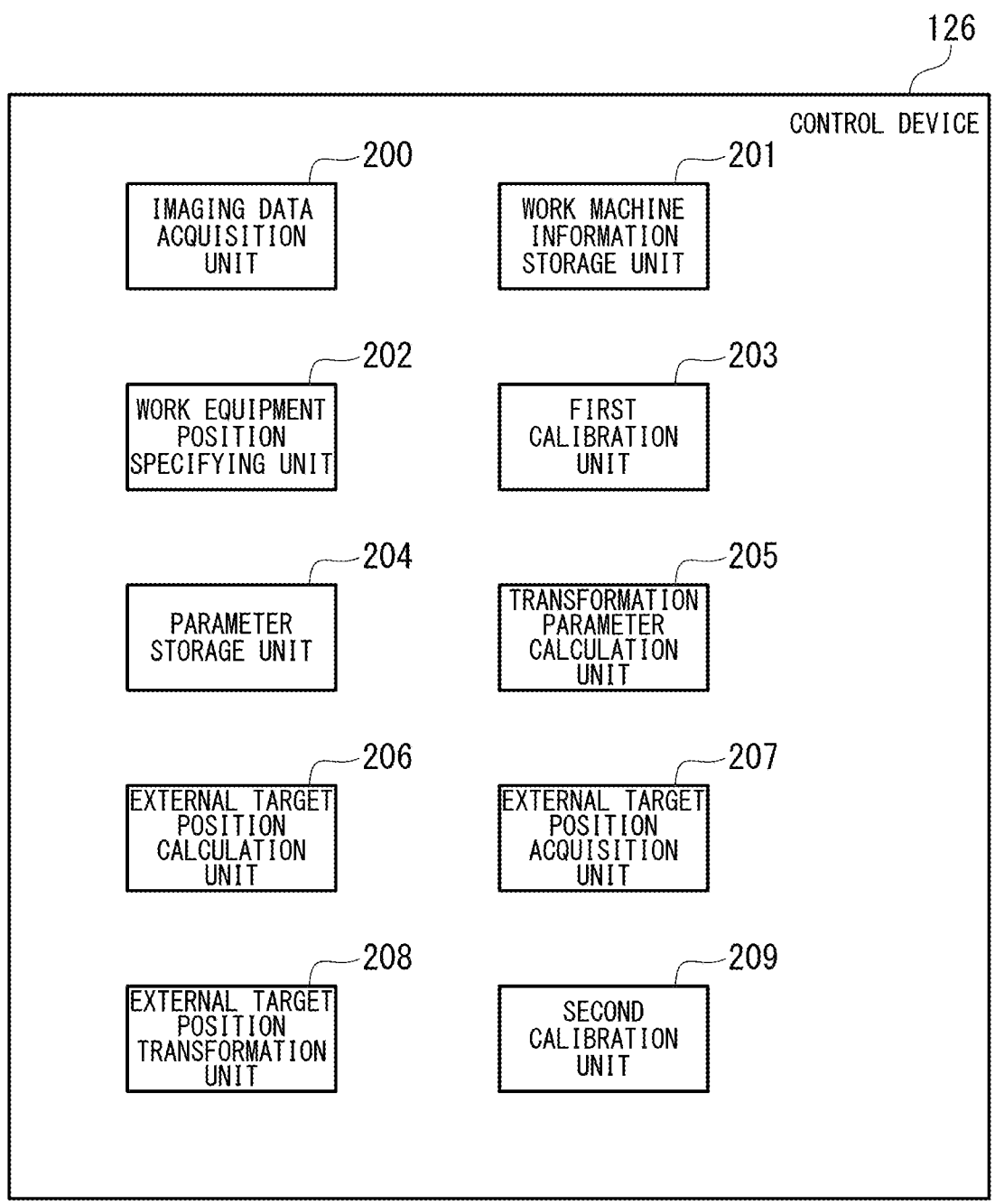
FIG. 11 is a block diagram representing a configuration of a control device of the hydraulic excavator according to the first embodiment.

FIG. 11 is a block diagram representing a configuration of the control device of the hydraulic excavator according to the first embodiment.

The control device 126 includes an imaging data acquisition unit 200, a work machine information storage unit 201, a work equipment position specifying unit 202, a first calibration unit 203, a parameter storage unit 204, a transformation parameter calculation unit 205, an external target position calculation unit 206, an external target position acquisition unit 207, an external target position transformation unit 208, and a second calibration unit 209.

The imaging data acquisition unit 200 acquires an image obtained by imaging of each camera of the stereo camera 125 and generates three-dimensional data of an imaging target by stereo measurement. The image and the three-dimensional data are examples of imaging data.

The work machine information storage unit 201 stores the size L1 of the boom 111, the size L2 of the arm 112, the size L3 of the bucket 113, the contour shape of the bucket 113, the positional relation between the position of the representative point O of the swing body 120 and the boom pin P1, and the like.

The work equipment position specifying unit 202 specifies the position and the posture of the bucket 113 based on the stroke amounts of the boom cylinder 114, the arm cylinder 115, and the bucket cylinder 116, which are detected by the work equipment position detector 117, and the values of specifications stored in the work machine information storage unit 201. Thus, the work equipment position specifying unit 202 specifies the position of the work equipment target Tm in the vehicle body coordinate system.

The first calibration unit 203 calculates and updates the parameters of the stereo camera 125, that is, performs calibration by a convergence calculation based on the position (positions p1 to p8) of the work equipment target Tm in the vehicle body coordinate system, which is specified by the work equipment position specifying unit 202, the position in a captured image of each camera for the external target Tg at the positions p1 to p8, and the position in a captured image of each camera for the work equipment target Tm at the positions p11 to p18 being unknown points. The first calibration unit 203 records the parameters obtained by the calculation (for example, each matrix of Expression (1) and Expression (3)) in the parameter storage unit 204.

The parameter storage unit 204 stores the parameters of the stereo camera 125.

The transformation parameter calculation unit 205 calculates a transformation parameter between the site coordinate system and the vehicle body coordinate system, based on the position and the azimuth direction of the swing body 120, which are calculated by the position and azimuth direction calculator 123 and the tilt angle of the swing body 120, which is detected by the tilt detector 124. Thus, coordinate transformation is performed on the parameters that indicate the position and the posture of the stereo camera 125 in the vehicle body coordinate system and are stored in the parameter storage unit 204, and thus it is possible to specify the position and the posture of the stereo camera 125 in the site coordinate system. The transformation parameter calculation unit 205 is an example of an imaging device position acquisition unit that acquires the position of the imaging device.

The external target position calculation unit 206 calculates the position of the external target Tg in the vehicle body coordinate system by coordinate-transforming the position of the external target Tg in the camera coordinate system, which is obtained by the imaging data acquisition unit 200 performing stereo measurement, by using the parameters of the stereo camera 125, which are stored in the parameter storage unit 204. The external target position calculation unit 206 is an example of a first positional relation specifying unit that specifies a first positional relation being the positional relation between the stereo camera 125 and the external target Tg, based on the captured image of the stereo camera 125.

The external target position acquisition unit 207 calculates the position p20 of the external target Tg in the site coordinate system by adding the height h to the center of the figure on the external target Tg to the known position of the GNSS reference station C in the site coordinate system. In the first embodiment, the position of the known GNSS reference station C in the site coordinate system and the height h to the center of the figure on the external target Tg are incorporated in advance in a program for operating the control device 126. In another embodiment, the position and the height h of the GNSS reference station C in the site coordinate system may be input through the interface 940 by the operation and the like of the operator. The input value may be recorded in the storage 930, and the external target position acquisition unit 207 may read the recorded value. In another embodiment, when any point in which the position in the site coordinate system is known is not provided immediately below the center of the figure (for example, when the lower left of the display plate Tg2 is aligned with the GNSS reference station C), the external target position acquisition unit 207 calculates the position p20 by using information indicating a relative position between a point in which the position in the site coordinate system is known and the center of the figure, instead of the height h.

The external target position transformation unit 208 uses the transformation parameter calculated by the transformation parameter calculation unit 205 to transform the position of the external target Tg in the site coordinate system, which is calculated by the external target position acquisition unit 207, into the position in the vehicle body coordinate system. That is, the external target position transformation unit 208 can specify the positional relation between the stereo camera 125 and the external target Tg in the vehicle body coordinate system. The external target position transformation unit 208 is an example of a second positional relation specifying unit that specifies a second positional relation being the positional relation between the stereo camera 125 and the external target Tg, based on the position of the stereo camera 125 and the position of the external target Tg.

The second calibration unit 209 updates the parameters stored in the parameter storage unit 204 in a manner that the second calibration unit repeats (performs a convergence calculation) a calculation of correcting the parameters (position and posture in the vehicle body coordinate system) of the stereo camera 125 such that the difference between the first positional relation which is the positional relation between the stereo camera 125 and the external target Tg and is calculated by the external target position calculation unit 206 and the second positional relation which is the positional relation between the stereo camera 125 and the external target Tg and is obtained by the external target position transformation unit 208. The second calibration unit 209 repeats such a calculation until the difference between the first positional relation and the second positional relation becomes equal to or smaller than a predetermined value.

<<Calibration Method of Stereo Camera>>

Figure 12:
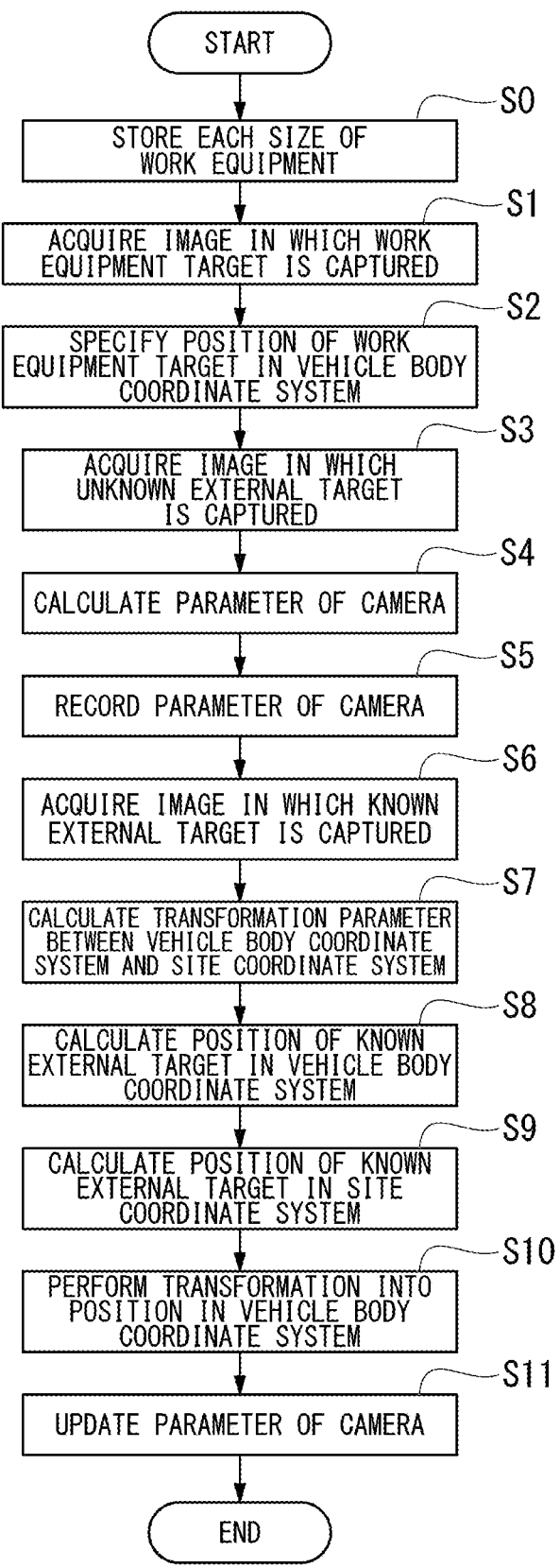
FIG. 12 is a flowchart representing the calibration method for the stereo camera according to the first embodiment.

FIG. 12 is a flowchart representing the calibration method for the stereo camera according to the first embodiment.

Before the calibration of the stereo camera 125 is started, each size of the work equipment 110 is stored in advance in the work machine information storage unit 201 (Step S0).

The operator of the hydraulic excavator 100 operates the operation device 1211 such that the work equipment target Tm comes to a predetermined position, for example, each of the positions p1 to p8 represented in FIG. 6, to drive the work equipment 110.

When the work equipment target Tm comes to each of the positions p1 to p8, the operator operates the operation device 1211 to output an imaging command to the stereo camera 125. Thus, the imaging data acquisition unit 200 of the control device 126 acquires an image obtained by imaging of each camera of the stereo camera 125 for each position (positions p1 to p8) of the work equipment target Tm (Step S1). At this time, the work equipment position specifying unit 202 specifies the position of the work equipment target Tm in the vehicle body coordinate system, for each position of the work equipment target Tm, based on the stroke amounts of the boom cylinder 114, the arm cylinder 115, and the bucket cylinder 116, which are detected by the work equipment position detector 117 and the values of specifications, which are stored in the work machine information storage unit 201 (Step S2).

The worker at the construction site installs the external target Tg at any position, for example, each of the positions p11 to p19 represented in FIG. 8. At this time, the position in which the external target Tg is installed is an unknown point. That is, the worker does not have to know the accurate positions of the positions p11 to p19.

After the external target Tg is installed at any position, the operator operates the operation device 1211, and outputs an imaging command to the stereo camera 125. The imaging data acquisition unit 200 of the control device 126 acquires an image obtained by imaging of each camera of the stereo camera 125 (Step S3).

The first calibration unit 203 calculates the parameters of the stereo camera 125 by a convergence calculation based on the center positions of the positions p1 to p8 and p11 to p19 in each captured image and the positions of the positions p1 to p8 in the vehicle body coordinate system (Step S4). When the first calibration unit 203 obtains the parameter, the first calibration unit 203 records and updates the obtained parameter in the parameter storage unit 204 (Step S5).

Then, the operator operates the operation device 1211 and moves the hydraulic excavator 100 such that the external target Tg provided immediately above (known point) the GNSS reference station C is located outside the work range of the work equipment 110, as represented in FIG. 10. When the operator determines that the external target Tg is located outside the work range of the work equipment 110, the operator operates the operation device 1211 and outputs an imaging command to the stereo camera 125. The imaging data acquisition unit 200 of the control device 126 acquires an image obtained by imaging of each camera of the stereo camera 125 and performs stereo measurement based on the image, and thereby calculating the position of the external target Tg in the camera coordinate system (Step S6).

Then, the transformation parameter calculation unit 205 calculates a transformation parameter between the site coordinate system and the vehicle body coordinate system, based on the position and the azimuth direction of the swing body 120, which are calculated by the position and azimuth direction calculator 123 and the tilt angle of the swing body 120, which is detected by the tilt detector 124 (Step S7).

The external target position calculation unit 206 performs transformation and calculation of the position of the external target Tg in the camera coordinate system, which is obtained by the imaging data acquisition unit 200 performing stereo measurement in Step S6, into the position of the external target Tg in the vehicle body coordinate system, by using the parameters of the stereo camera 125, which are stored in the parameter storage unit 204 (Step S8).

The external target position acquisition unit 207 calculates the center position of the external target Tg in the site coordinate system by adding the height to the center of the figure on the external target Tg to the known position of the GNSS reference station C in the site coordinate system (Step S9). Then, the external target position transformation unit 208 uses the transformation parameter between the site coordinate system and the vehicle body coordinate system, which is calculated by the transformation parameter calculation unit 205 to transform the position of the external target Tg in the site coordinate system, which is calculated by the external target position acquisition unit 207, into the position in the vehicle body coordinate system (Step S10).

The second calibration unit 209 performs a convergence calculation of the parameters of the stereo camera such that the difference between the position of the external target Tg, which is calculated by the external target position calculation unit 206 and the position of the external target Tg, which is obtained by the external target position transformation unit 208 is minimized. Then, the second calibration unit updates the parameters stored in the parameter storage unit 204 (Step S11). The second calibration unit 209 may update at least a scale-related parameter in stereo measurement among the parameters stored in the parameter storage unit 204. Thus, the control device 126 can calibrate the stereo camera 125 such that it is possible to calculate the distance of a point farther than the work range of the work equipment 110 with higher accuracy. As described above, the second calibration unit 209 may calibrate the parameters of the camera such that the distance difference (between the first distance and the second distance) between the camera and the external target Tg is minimized in Step S11.

<<Operation and Effects>>

As described above, according to the first embodiment, the control device 126 calibrates the stereo camera 125 based on the first positional relation between the stereo camera 125 and the external target Tg, which is specified by stereo measurement based on the captured image of the stereo camera 125 and the second positional relation specified based on the position of the stereo camera 125 and the position of the external target Tg. Since the external target Tg is not provided on the work equipment 110 but at the construction site, the stereo camera 125 can be calibrated by setting the distance between the stereo camera 125 and the external target Tg to any value. Accordingly, the control device 126 can calibrate the stereo camera 125 by setting the distance between the stereo camera 125 and the external target Tg to be outside the work range of the work equipment 110, such that the measurement accuracy of the scale at a point farther than the work range of the work equipment 110 becomes high.

According to the first embodiment, the external target Tg is provided directly above the GNSS reference station C. Thus, the control device 126 can reliably specify the position of the external target Tg in the site coordinate system.

According to the first embodiment, the control device 126 firstly calibrates the parameters of the stereo camera 125 based on the work equipment target Tm provided on the work equipment 110 and the external target Tg at an unknown point. Then, the control device 126 updates the parameters of the stereo camera 125 based on the external target Tg at the known point. Thus, before the calibration using the external target Tg at the known point, the parameters of the stereo camera 125 are obtained such that the accuracy becomes high at least in the work range of the work equipment 110. Then, the control device 126 can update the parameter of the stereo camera 125 such that the accuracy becomes high even outside the work range of the work equipment 110, by performing the calibration based on the external target Tg at the known point. The present invention is not limited thereto in other embodiments. The control device 126 may simultaneously perform, for example, calibration of the parameters of the stereo camera 125 based on the work equipment target Tm and the external target Tg at the unknown point, and calibration of the parameters of the stereo camera 125 based on the external target Tg at the known point.

In the first embodiment, the work equipment target Tm is attached to the central blade, and the control device 126 performs the convergence calculation based on this, but the present invention is not limited thereto. For example, in another embodiment, the work equipment target Tm may be attached to a plurality of blades, for example, to the total three blades including a central blade and blades at both left and right ends. Here, the position of the work equipment target Tm provided on blades other than the central blade in the vehicle body coordinate system does not have to be accurately understood. That is, if at least one of the work equipment targets Tm is installed at a known point, another work equipment target Tm may be installed at an unknown point. Similarly in a second embodiment as follows, the work equipment target Tm may be attached to a plurality of blades.

Second Embodiment

The second embodiment will be described.

The control device 126 of the hydraulic excavator 100 according to the first embodiment performs two-step calibration in which calibration using the work equipment target Tm and the external target Tg being an unknown point is performed, and then calibration using the known external target Tg in which the position in the site coordinate system is known is performed. On the other hand, the control device 126 according to the second embodiment calibrates the stereo camera 125 at once by using the work equipment target Tm, the external target Tg being the unknown point, and the known external target Tg in which the position in the site coordinate system is known.

<<Calibration Method of Stereo Camera>>

Figure 13:
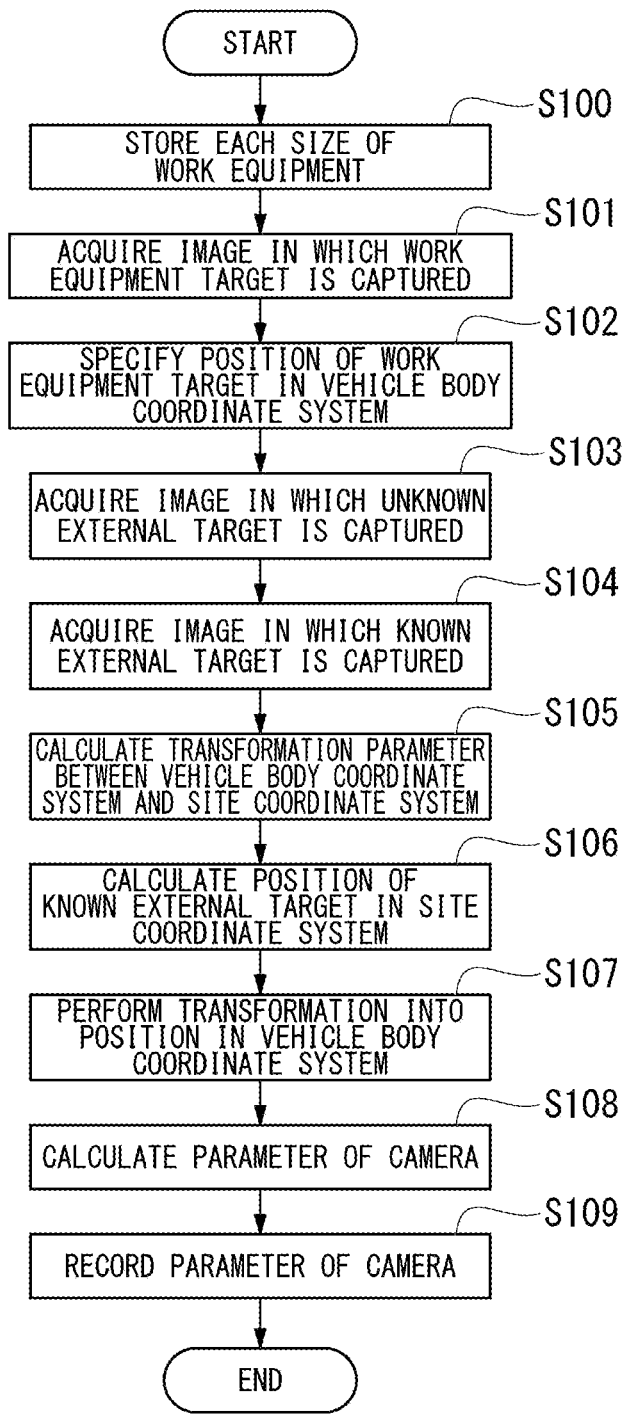
FIG. 13 is a flowchart representing a calibration method for a stereo camera according to a second embodiment.

FIG. 13 is a flowchart representing a calibration method for the stereo camera according to the second embodiment.

Before the calibration of the stereo camera 125 is started, each size of the work equipment 110 is stored in advance in the work machine information storage unit 201 (Step S100).

The operator of the hydraulic excavator 100 operates the operation device 1211 such that the work equipment target Tm comes to a predetermined position, for example, each of the positions p1 to p8 represented in FIG. 6, to drive the work equipment 110.

When the work equipment target Tm comes to each of the positions p1 to p8, the operator operates the operation device 1211 to output an imaging command to the stereo camera 125. Thus, the imaging data acquisition unit 200 of the control device 126 acquires an image obtained by imaging of each camera of the stereo camera 125 for each position (positions p1 to p8) (Step S101). At this time, the work equipment position specifying unit 202 specifies the position of the work equipment target Tm in the vehicle body coordinate system, for each position, based on the stroke amounts of the boom cylinder 114, the arm cylinder 115, and the bucket cylinder 116, which are detected by the work equipment position detector 117 and the values of specifications, which are stored in the work machine information storage unit 201 (Step S102).

The worker at the construction site installs the external target Tg at any position (unknown position), for example, each of the positions p11 to p19 represented in FIG. 8.

Every time the operator determines that the external target Tg is installed at any one of the positions p11 to p19, the operator operates the operation device 1211 and outputs an imaging command to the stereo camera 125. The imaging data acquisition unit 200 of the control device 126 acquires an image obtained by imaging of each camera of the stereo camera 125 for each position (positions p11 to p19) (Step S103).

Then, the operator operates the operation device 1211 and moves the hydraulic excavator 100 such that the external target Tg provided immediately above (known point) the GNSS reference station C is located outside the work range of the work equipment 110, as represented in FIG. 10. When the operator determines that the external target Tg is outside the work range of the work equipment 110, the operator operates the operation device 1211 and outputs an imaging command to the stereo camera 125. The imaging data acquisition unit 200 of the control device 126 acquires an image obtained by imaging of each camera of the stereo camera 125 and obtains the center position of the external target Tg in the captured image (Step S104). The center position of the external target Tg in the captured image is an example of imaging data of the external target Tg.

Then, the transformation parameter calculation unit 205 calculates a transformation parameter between the site coordinate system and the vehicle body coordinate system, based on the position and the azimuth direction of the swing body 120, which are calculated by the position and azimuth direction calculator 123 and the tilt angle of the swing body 120, which is detected by the tilt detector 124 (Step S105).

The external target position acquisition unit 207 calculates the center position of the external target Tg in the site coordinate system by adding the height to the center of the figure on the external target Tg to the known position of the GNSS reference station C in the site coordinate system (Step S106). Then, the external target position transformation unit 208 uses the transformation parameter between the site coordinate system and the vehicle body coordinate system, which is calculated by the transformation parameter calculation unit 205 to transform the position of the external target Tg in the site coordinate system, which is calculated by the external target position acquisition unit 207, into the position in the vehicle body coordinate system (Step S107).

The first calibration unit 203 calculates the parameters of the stereo camera 125 by a convergence calculation based on the center positions of the positions p1 to p8, p11 to p19, and p20 in the captured image and the positions of the positions p1 to p8 and p20 in the vehicle body coordinate system (Step S108). The first calibration unit 203 records the obtained parameter in the parameter storage unit 204 (Step S109).

As described above, according to the second embodiment, the convergence calculation is performed based on the center positions of the positions p1 to p8, p11 to p19, and p20 in the captured image and the positions of the positions p1 to p8 and p20 in the vehicle body coordinate system. Thus, it is possible to secure the accuracy of the stereo measurement in the work range of the work equipment 110 and the accuracy of the stereo measurement in a range farther than the work range of the work equipment 110 by the one-step calibration work of the stereo camera 125.

In the second embodiment, the control device 126 specifies the position of the work equipment target Tm in the vehicle body coordinate system and performs the convergence calculation using the position. However, the invention is not limited thereto. For example, the control device 126 according to another embodiment may perform the convergence calculation based on the position of the known external target Tg in the vehicle body coordinate system and the center positions of the work equipment target Tm and the external target Tg in the captured image, without using the position of the work equipment target Tm in the vehicle body coordinate system.

Third Embodiment

A third embodiment will be described.
The control device 126 of the hydraulic excavator 100 according to the first and second embodiments performs calibration using the work equipment target Tm. On the other hand, the control device 126 according to the third embodiment calibrates the stereo camera 125 without using the work equipment target Tm.

Figure 14:
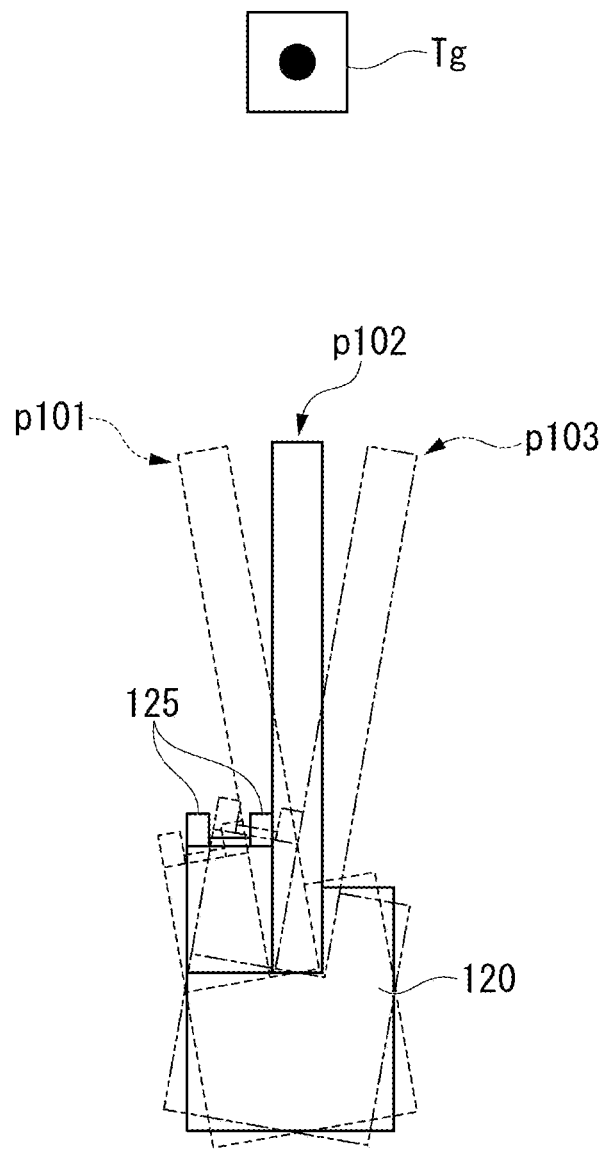
FIG. 14 is a diagram representing a position of an external target imaged by a stereo camera in a third embodiment.

FIG. 14 is a diagram representing the position of the external target Tg at a known point imaged by the stereo camera in the third embodiment.

In the third embodiment, when the stereo camera 125 is calibrated using the external target Tg at a known point installed outside the work range of the work equipment 110, the operator of the hydraulic excavator 100 swings the swing body 120 with respect to the external target Tg as represented in FIG. 14, and images the external target Tg located at different angles when viewed from the stereo camera 125. That is, the operator controls the swing body 120 such that the swing body 120 comes to positions p101, p102, and p103. At this time, the operator of the hydraulic excavator 100 may drive a travel body 130 and image the external target Tg from different distances a plurality of times. Each camera which forms the stereo camera 125 images the external target Tg at each position.

The control device 126 calculates the parameters of the stereo camera 125 by a convergence calculation based on the center positions of the positions p101 to p103 in the captured image of each camera and the position in the vehicle body coordinate system for the positions p101 to p103. That is, the control device 126 calibrates the stereo camera 125 using a plurality of relative positions between the stereo camera 125 and the external target Tg at known point.

<<Calibration Method of Stereo Camera>>

Figure 15:
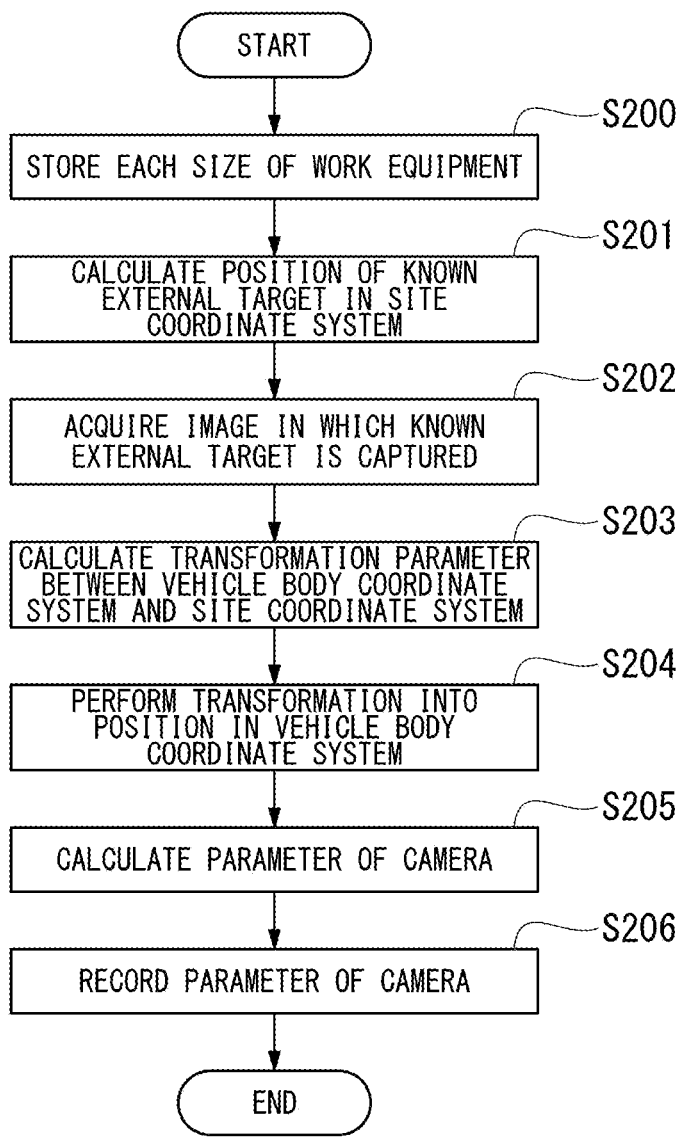
FIG. 15 is a flowchart representing a calibration method for the stereo camera according to the third embodiment.

FIG. 15 is a flowchart representing a calibration method for the stereo camera according to the third embodiment.

Before the calibration of the stereo camera 125 is started, in the parameter storage unit 204, each size of the work equipment 110 is stored in advance in the work machine information storage unit 201 (Step S200). Firstly, the external target position acquisition unit 207 calculates the position of the external target Tg in the site coordinate system by adding the height h to the center of the figure on the external target Tg to the known position of the GNSS reference station C in the site coordinate system (Step S201).

Then, the operator of the hydraulic excavator 100 travels the hydraulic excavator 100 such that the relative position between the hydraulic excavator 100 and the external target Tg is outside the work range of the work equipment 110, and then operates the operation device 1211 to swing the swing body 120 such that the swing body 120 comes to any position, for example, each position of the positions p101 to p103 represented in FIG. 14.

When the operator moves the swing body 120 to each of the positions p101 to p103, the operator operates the operation device 1211 and outputs an imaging command to the stereo camera 125. Thus, the imaging data acquisition unit 200 of the control device 126 acquires an image obtained by imaging of each camera of the stereo camera 125 at each position (positions p101 to p103), and obtains the center position of the external target Tg in the captured image (Step S202).

Then, the transformation parameter calculation unit 205 calculates a transformation parameter between the site coordinate system and the vehicle body coordinate system, for each position, based on the position and the azimuth direction of the swing body 120, which are calculated by the position and azimuth direction calculator 123 and the tilt angle of the swing body 120, which is detected by the tilt detector 124 (Step S203).

Then, the external target position transformation unit 208 uses the transformation parameter calculated by the transformation parameter calculation unit 205 to transform the position of the external target Tg in the site coordinate system, which is calculated by the external target position acquisition unit 207, into the position in the vehicle body coordinate system for each position (Step S204).

The first calibration unit 203 calculates the parameters of the stereo camera 125 based on the center positions of the positions p101 to p103 in the captured image and the positions in the vehicle body coordinate system for the positions p101 to p103 (Step S205). When the first calibration unit 203 obtains the parameter, the first calibration unit 203 records the obtained parameter in the parameter storage unit 204 (Step S206).

<<Operation and Effects>>

As described above, according to the third embodiment, the control device 126 sets the distance between the stereo camera 125 and the external target Tg to be farther than the work range of the work equipment 110. Thus, for a point farther than the work range of the work equipment 110, the control device 126 can calibrate the stereo camera 125 so as to enable calculation of the distance with high accuracy.

According to the third embodiment, the control device 126 specifies the center position of the external target Tg in the captured image and the position in the vehicle body coordinate system transformed from the position of the external target Tg in the site coordinate system, for each relative position between the stereo camera 125 and the external target Tg. Then, the control device 126 calibrates the stereo camera 125 based on the specified positions. Thus, the control device 126 can obtain the parameters of the stereo camera 125 with higher accuracy. Accordingly, it is possible to omit calibration using the work equipment target Tm and directly calibrate the stereo camera 125 using the external target Tg.

Regarding a plurality of relative positions between the stereo camera 125 and the external target Tg, the control device 126 according to the third embodiment acquires the captured image for each relative position by swinging the hydraulic excavator 100. However, the invention is not limited thereto. For example, in another embodiment, regarding the plurality of relative positions, the control device may acquire a captured image for each relative position by traveling the hydraulic excavator 100. For example, the hydraulic excavator 100 may be caused to travel such that the external target Tg is at a position (short distance) within the work range of the work equipment 110 and the external target Tg is at a position (far distance) outside the work range of the work equipment 110. The captured image may be acquired at each position.

In another embodiment, the captured image may be acquired for each relative position between the stereo camera 125 and the plurality of external targets Tg, by installing the external target Tg at each of a plurality of known points. In this case, the control device 126 calibrates the imaging device based on the positions of the plurality of external targets Tg and the imaging data of the plurality of external targets Tg. In another embodiment, the external targets Tg may be installed at a plurality of random positions, the positions of the respective external targets Tg may be measured by a highly accurate sensor, and the measured position may be used as the external target Tg at the known point. Further, in another embodiment, the control device 126 may change the relative position between the stereo camera 125 and the plurality of external targets Tg by swinging or traveling the hydraulic excavator 100, and acquire a captured image for each relative position. In this case, the control device 126 calibrates the imaging device based on the positions of the plurality of external targets Tg for each positional relation and the imaging data of the plurality of external targets Tg for each positional relation.

That is, the number of external targets Tg may be one or more, and the number of relative positions between the stereo camera 125 and the external target Tg during imaging may also be one or more. That is, the stereo camera 125 may image one external target Tg once without changing the posture of the hydraulic excavator 100, or may image a plurality of external targets Tg once without changing the posture of the hydraulic excavator 100. The one external target Tg may be imaged a plurality of times by changing the posture of the hydraulic excavator 100, or the plurality of the external targets Tg may be imaged a plurality of times by changing the posture of the hydraulic excavator 100.

The control device 126 according to the third embodiment performs the convergence calculation based on the center position of the external target Tg at the known point in the captured image and the position of the external target Tg relating to the known point in the site coordinate system. However, the invention is not limited thereto. For example, the control device 126 according to another embodiment may perform the convergence calculation based on the center position of the external target Tg relating to a known point in the captured image, the center position of the external target Tg relating to an unknown point in the captured image, and the position of the external target Tg relating to a known point, in the site coordinate system.

Fourth Embodiment

A fourth embodiment will be described.

The calibration process in the first to third embodiments can be performed as initial calibration or a calibration process performed when the stereo camera 125 is shifted. In order for the control device 126 of the hydraulic excavator 100 to accurately recognize the terrain, it is preferable that the parameters of the stereo camera 125 be appropriately maintained. It is complicated to perform the calibration process when the stereo camera 125 is not shifted.

Therefore, in the fourth embodiment, a calibration system is provided in which, after the calibration process is performed by the method described in any one of the first to third embodiments, it is periodically checked whether or not the stereo camera 125 is shifted, and when the stereo camera 125 is shifted, the calibration process can be performed.

<<Calibration System>>

Figure 16:
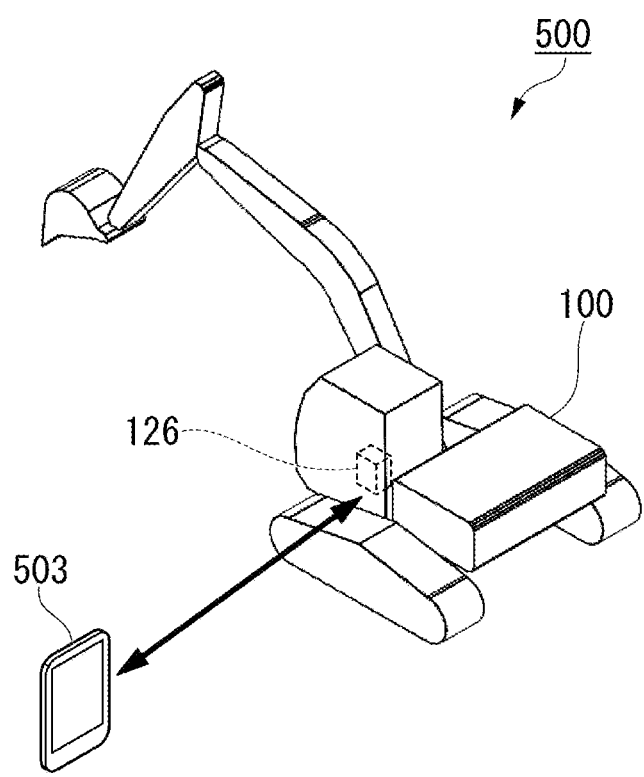
FIG. 16 is a schematic diagram representing a configuration of a calibration system according to a fourth embodiment.

FIG. 16 is a schematic diagram representing a configuration of the calibration system according to the fourth embodiment.

A calibration system 500 according to the fourth embodiment includes the hydraulic excavator 100 and a terminal device 503. Examples of the terminal device 503 include a mobile terminal, a PC, an in-vehicle monitor, and the like, which are operated by an operator. The control device 126 of the hydraulic excavator 100 can communicate with the terminal device 503 by wired communication or short-range wireless communication such as a wireless LAN. The terminal device 503 provides a user interface for assisting a parameter check process and a calibration process by the operator.

<Configuration of Control Device>

Figure 17:
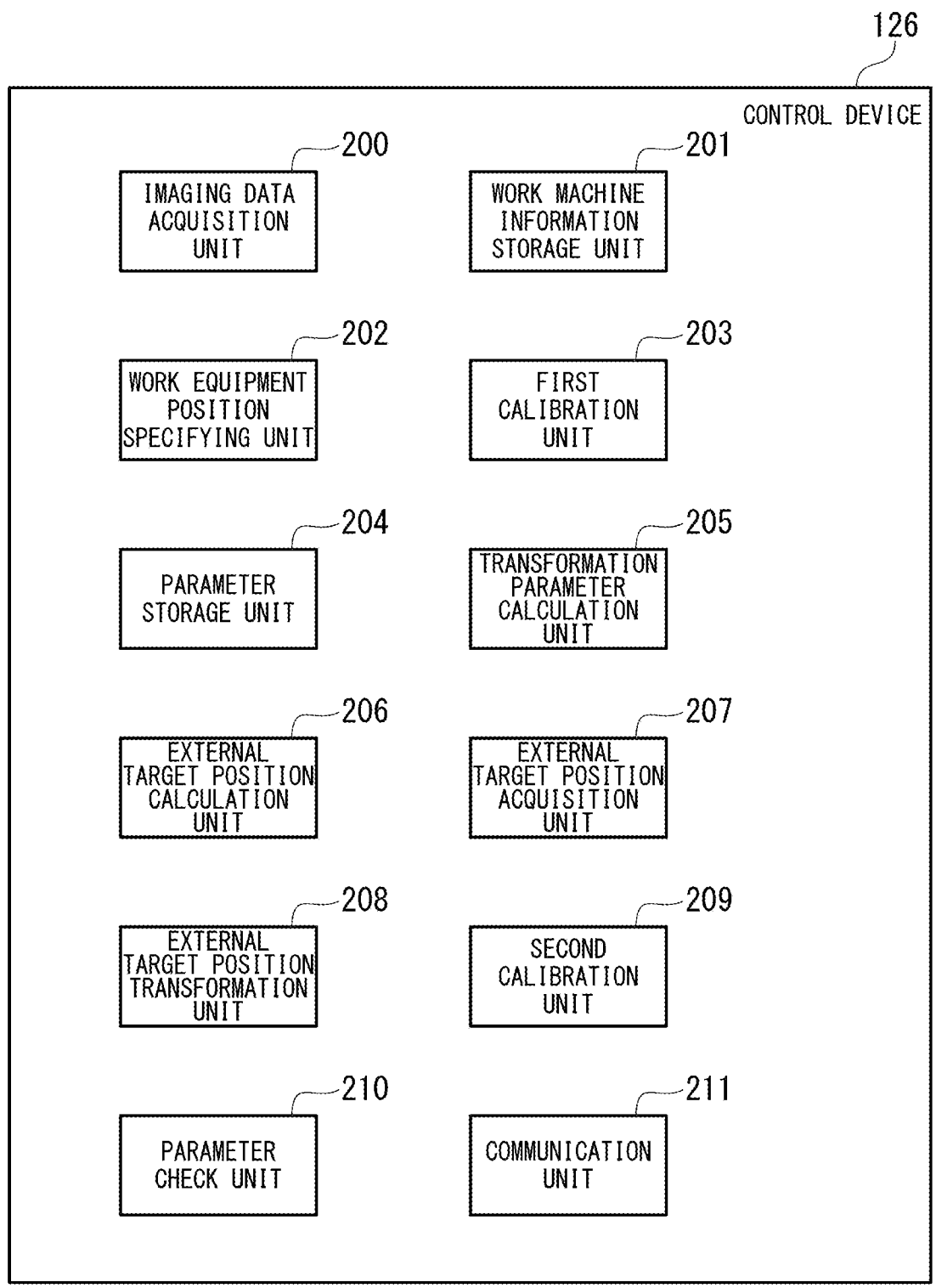
FIG. 17 is a schematic block diagram representing a configuration of a control device according to the fourth embodiment.

FIG. 17 is a schematic block diagram representing a configuration of the control device according to the fourth embodiment.

The control device 126 according to the fourth embodiment further includes a parameter check unit 210 and a communication unit 211 in addition to the configuration of the control device 126 according to the first to third embodiments. The description of the processing according to any one of the first to third embodiments will be omitted. The parameter check unit 210 determines whether or not calibration of the parameters stored in the parameter storage unit 204 is required. Specifically, the parameter check unit 210 determines the necessity of calibration, based on the difference between the acquired known target position and the external target position specified by the stereo measurement. That is, the control device 126 is an example of a monitoring device of the imaging device.

The communication unit 211 transmits and receives data by communicating with the terminal device 503. The communication unit 211 is an example of an output unit that outputs a determination result of the necessity of calibration.

<<Configuration of Terminal Device>>

Figure 18:
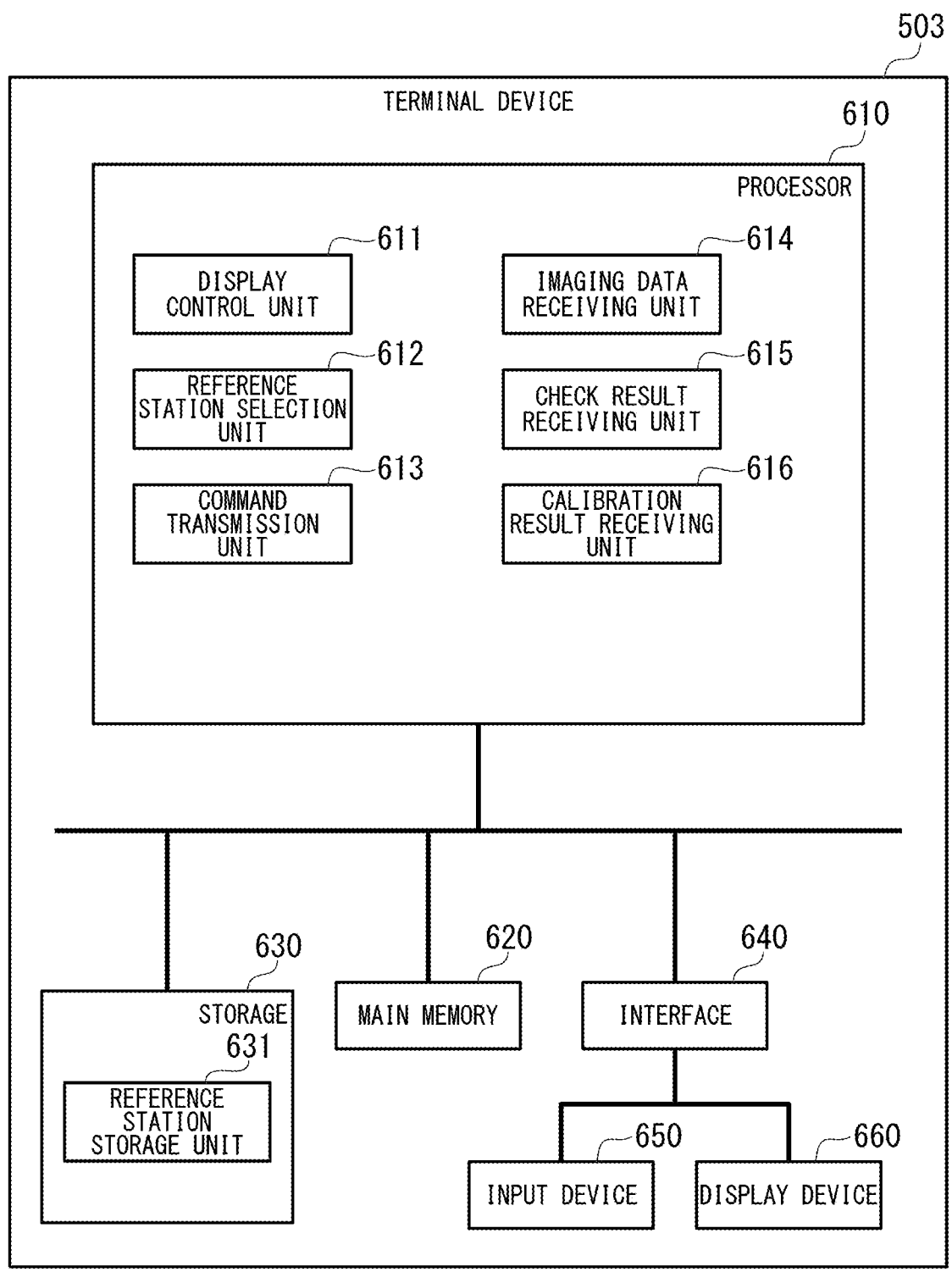
FIG. 18 is a schematic block diagram representing a configuration of a terminal device according to the fourth embodiment.

FIG. 18 is a schematic block diagram representing a configuration of the terminal device according to the fourth embodiment.

The terminal device 503 includes a processor 610, a main memory 620, a storage 630, an interface 640, an input device 650, and a display device 660.

The storage 630 stores a program for assisting the parameter check process and the calibration process. Examples of the storage 630 include a hard disk drive (HDD) and a non-volatile memory. The storage 630 may be an internal medium which is directly connected to a bus of the terminal device 503, or may be an external medium which is connected to the terminal device 503 through the interface 640 or a communication line.

The processor 610 reads out the program from the storage 630, expands the program in the main memory 620, and executes the process in accordance with the program. The processor 610 secures a storage region in the main memory 620 in accordance with the program. The interface 640 is connected to the control device 126 of the hydraulic excavator 100 by short-range wireless communication, and transmits and receives signals. The input device 650 and the display device 660 are connected to the processor 610 through the interface 640. Examples of the input device 650 and the display device 660 include a touch panel.

The processor 610 includes a display control unit 611, a reference station selection unit 612, a command transmission unit 613, an imaging data receiving unit 614, a check result receiving unit 615, and a calibration result receiving unit 616 by reading a program from the storage 630. The storage region of the reference station storage unit 631 is secured in the storage 630. In another embodiment, the position information of the GNSS reference station C may be stored in the control device 126.

The reference station storage unit 631 stores the position of the GNSS reference station C in the site coordinate system and the height (height h in FIG. 9) from the position relating to the GNSS reference station C to the center of a figure on the external target Tg installed on the GNSS reference station C, in association with each of a plurality of GNSS reference stations C provided on the construction site.

The display control unit 611 outputs display information to the display device 660. The reference station selection unit 612 receives the selection of the GNSS reference station C used for the parameter check among a plurality of GNSS reference stations C stored in the reference station storage unit 631, from the operator through the input device 650. In another embodiment, the reference station selection unit 612 may receive the position information of the external target Tg obtained by the stereo measurement of an image captured by the stereo camera 125, from the control device 126.

Then, the reference station selection unit 612 may select a GNSS reference station C closest to the position indicated by the position information among the GNSS reference stations C stored in the reference station storage unit 631. In another embodiment, the terminal device 503 may include a reference station input unit that can directly input the coordinate position of the reference station, instead of the reference station selection unit 612.

The command transmission unit 613 transmits, to the control device 126, a start command of the parameter check and a start command of calibration, which are received from the operator through the input device 650.

The imaging data receiving unit 614 receives imaging data obtained by imaging of the stereo camera 125, from the control device 126.

The check result receiving unit 615 receives the result of the parameter check process from the control device 126. The result of the parameter check process is information indicating whether or not the calibration of the stereo camera 125 is required.

The calibration result receiving unit 616 receives the result of the calibration process from the control device 126. The result of the calibration process is information indicating whether or not the calibration process is successful.

<<Parameter Check and Calibration Method of Stereo Camera>>

Figure 19:
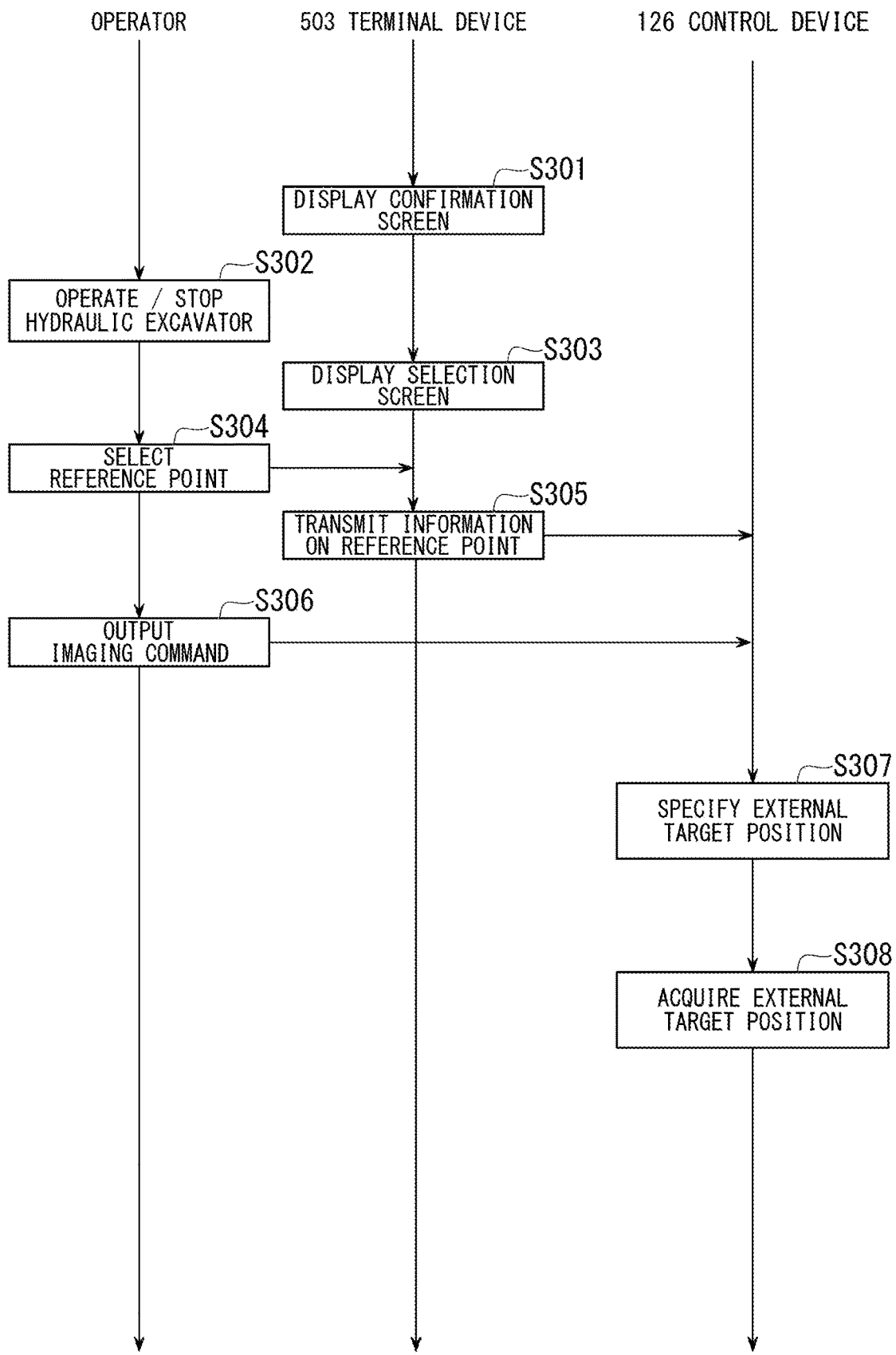
FIG. 19 is a sequence diagram representing a parameter check and calibration process according to the fourth embodiment.
Figure 20:
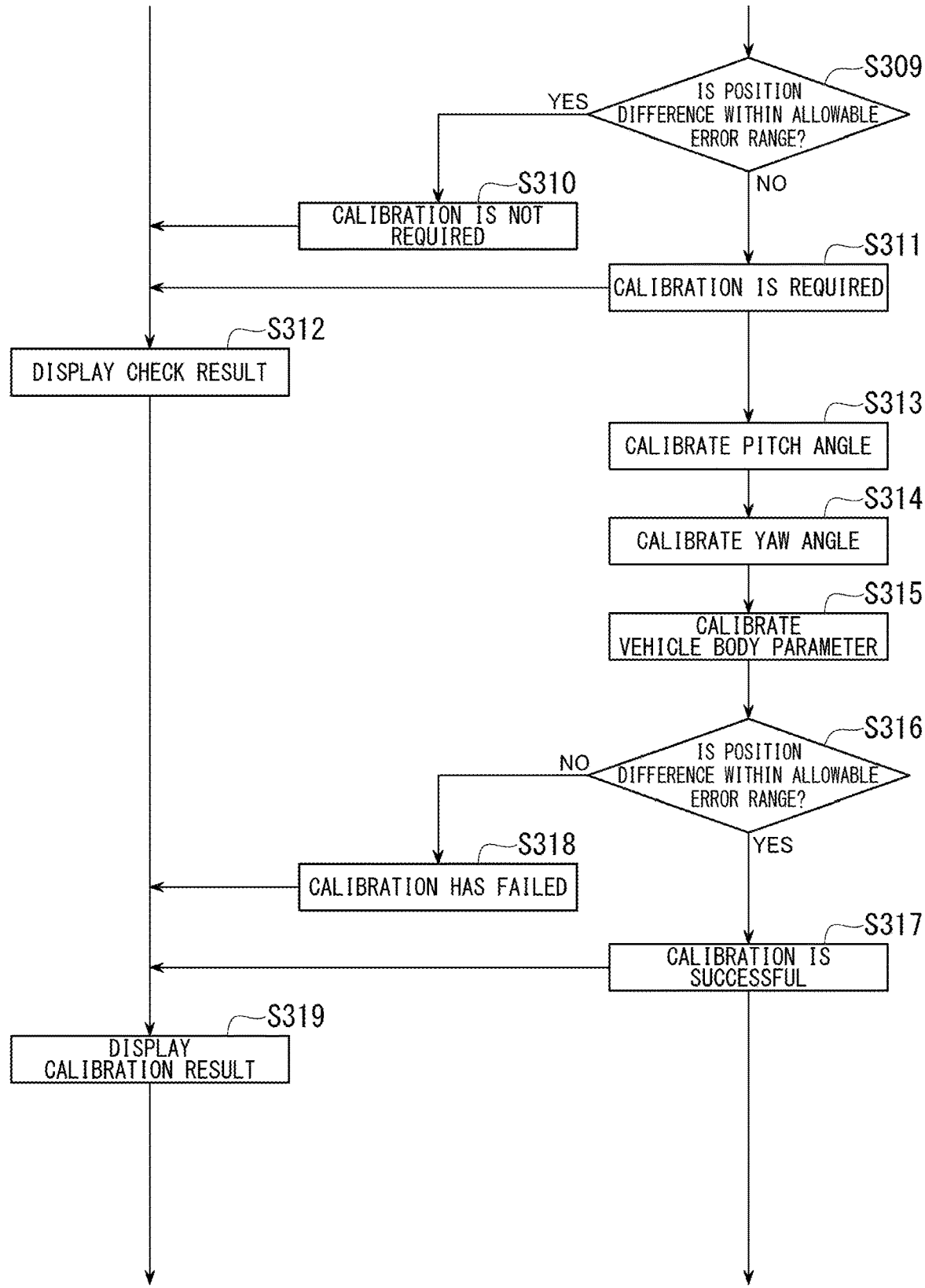
FIG. 20 is a sequence diagram representing the parameter check and calibration process according to the fourth embodiment.

FIGS. 19 and 20 are sequence diagrams representing the parameter check and calibration process according to the fourth embodiment. When a work using hydraulic excavator 100 starts, the operator determines whether or not to use the stereo camera 125 in the work of the day. When there is a possibility of using the stereo camera 125 in the work of the day, the operator performs parameter check as follows.

The distance (check distance) between the hydraulic excavator 100 and the external target Tg for maintaining the external target Tg located outside the work range of the work equipment 110 is set in advance. The operator travels and stops the hydraulic excavator 100 such that the distance between the hydraulic excavator 100 and the external target Tg approaches the check distance.

At this time, the terminal device 503 displays a confirmation screen for assisting the hydraulic excavator 100 to travel to an appropriate position with respect to the external target Tg (Step S301).

Figure 21:
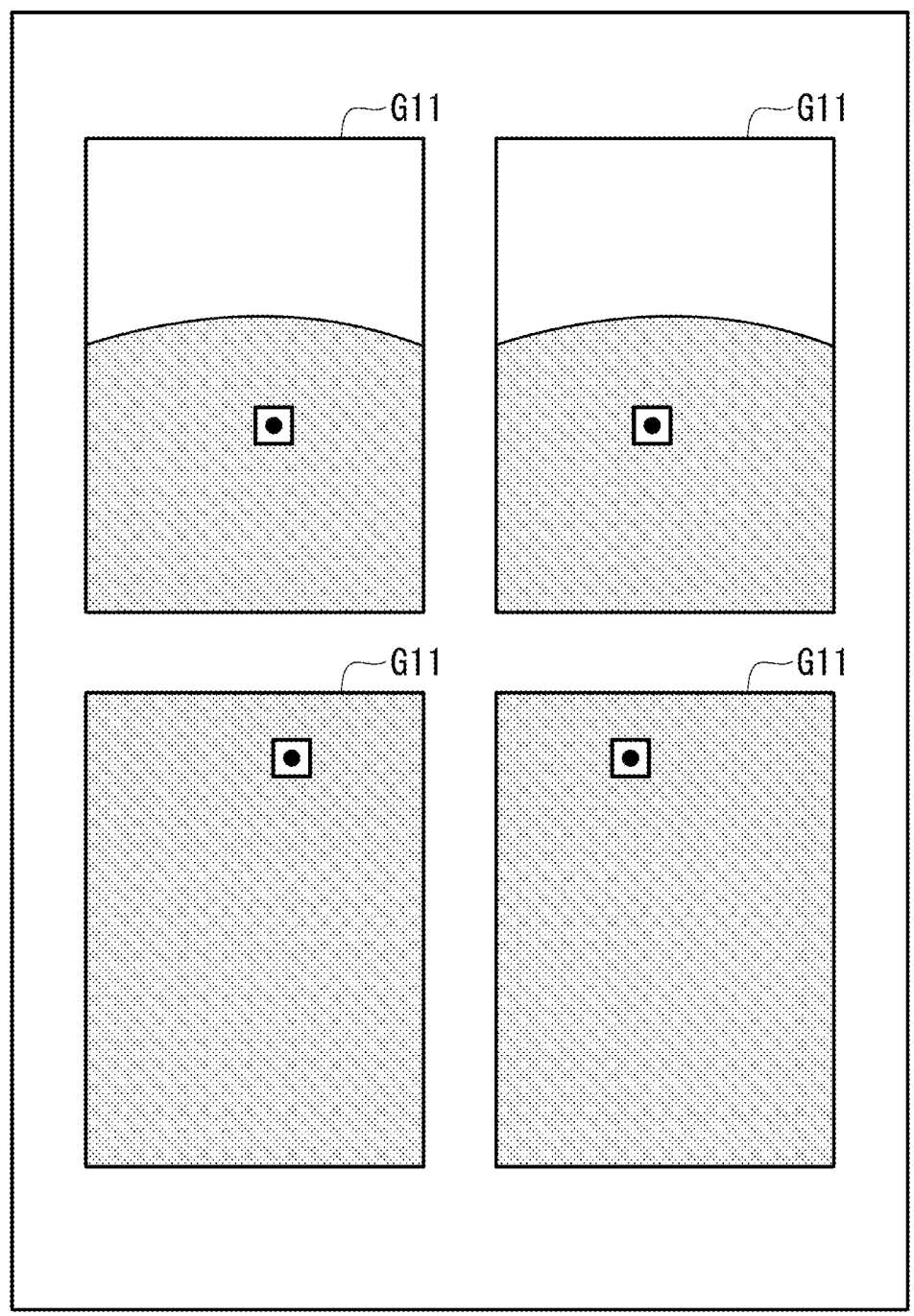
FIG. 21 is a diagram representing an example of a confirmation screen displayed in the terminal device according to the fourth embodiment.

FIG. 21 is a diagram representing an example of the confirmation screen displayed in the terminal device according to the fourth embodiment. As represented in FIG. 21, the confirmation screen includes an image G11 captured by each camera of the stereo camera 125. The captured image G11 is a moving image or a frame-by-frame image showing an instantaneous image captured by each camera before an imaging button of the stereo camera 125 is pressed. The captured image G11 is transmitted from the control device 126 of the hydraulic excavator 100. In another embodiment, the confirmation screen does not have to include the captured images G11 of all the cameras of the stereo camera 125. For example, the confirmation screen may include a captured image G11 captured by one of the paired cameras (for example, the first camera 1251 and the fourth camera 1254). The control device 126 may recognize the external target Tg shown in the captured image G11 obtained by imaging of each camera of the stereo camera 125 and perform stereo measurement, and thereby calculating the distance from the stereo camera 125 to the external target Tg. Then, the control device may transmit the distance to the terminal device 503, and thus the terminal device 503 may display the calculated distance on the confirmation screen. By referring to the distance displayed on the confirmation screen, the operator can travel the hydraulic excavator 100 such that the distance between the stereo camera 125 and the external target Tg becomes a preset check distance.

By visually recognizing the captured image G11 displayed on the confirmation screen, the operator can travel the hydraulic excavator 100 so that the external target Tg is captured by all the stereo cameras 125. Then, the operator can stop the hydraulic excavator 100 at the position where the external target Tg appears in all the captured images G11 on the confirmation screen (Step S302).

Figure 22:
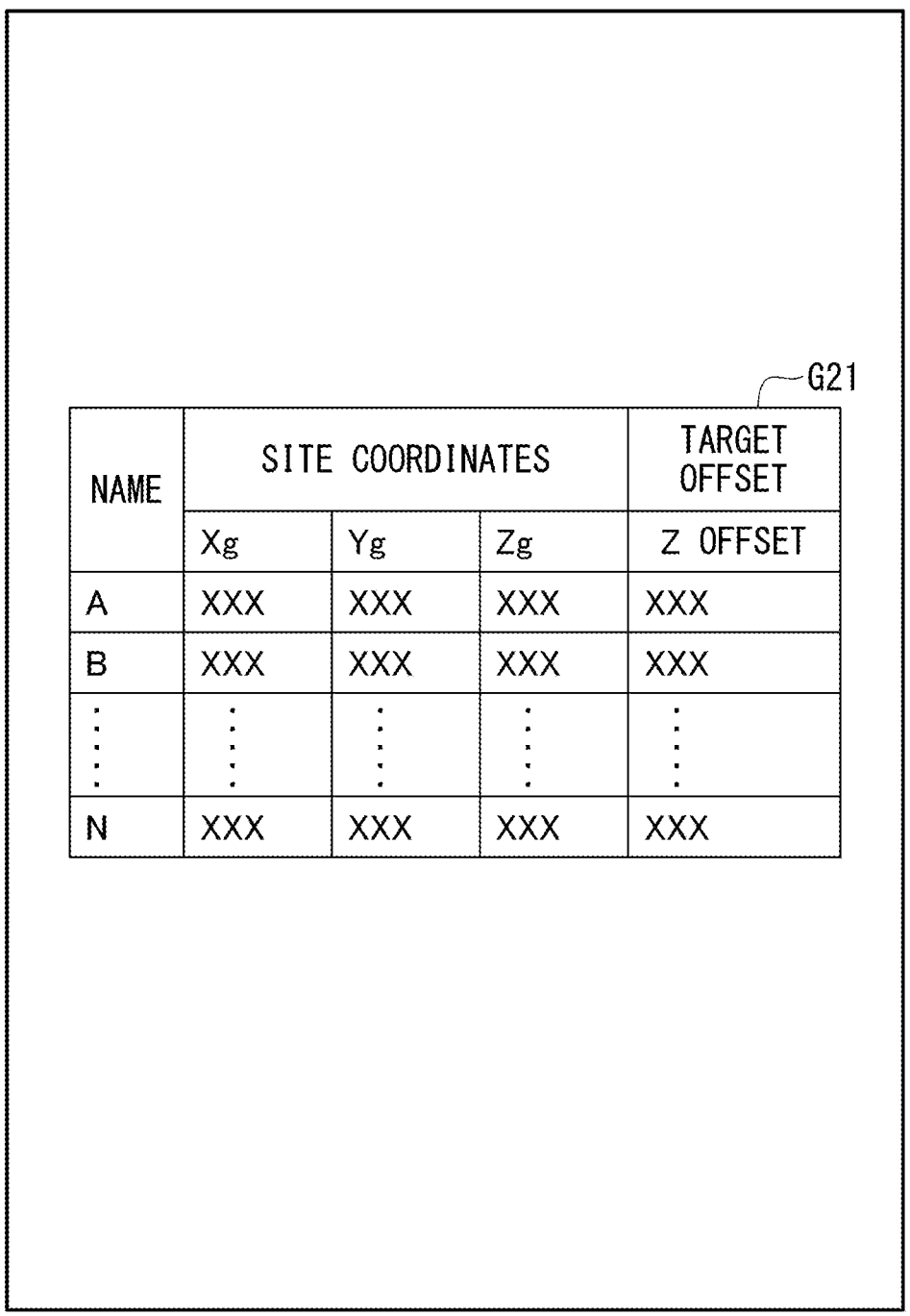
FIG. 22 is a diagram representing an example of a selection screen displayed in the terminal device according to the fourth embodiment.
Figure 23:
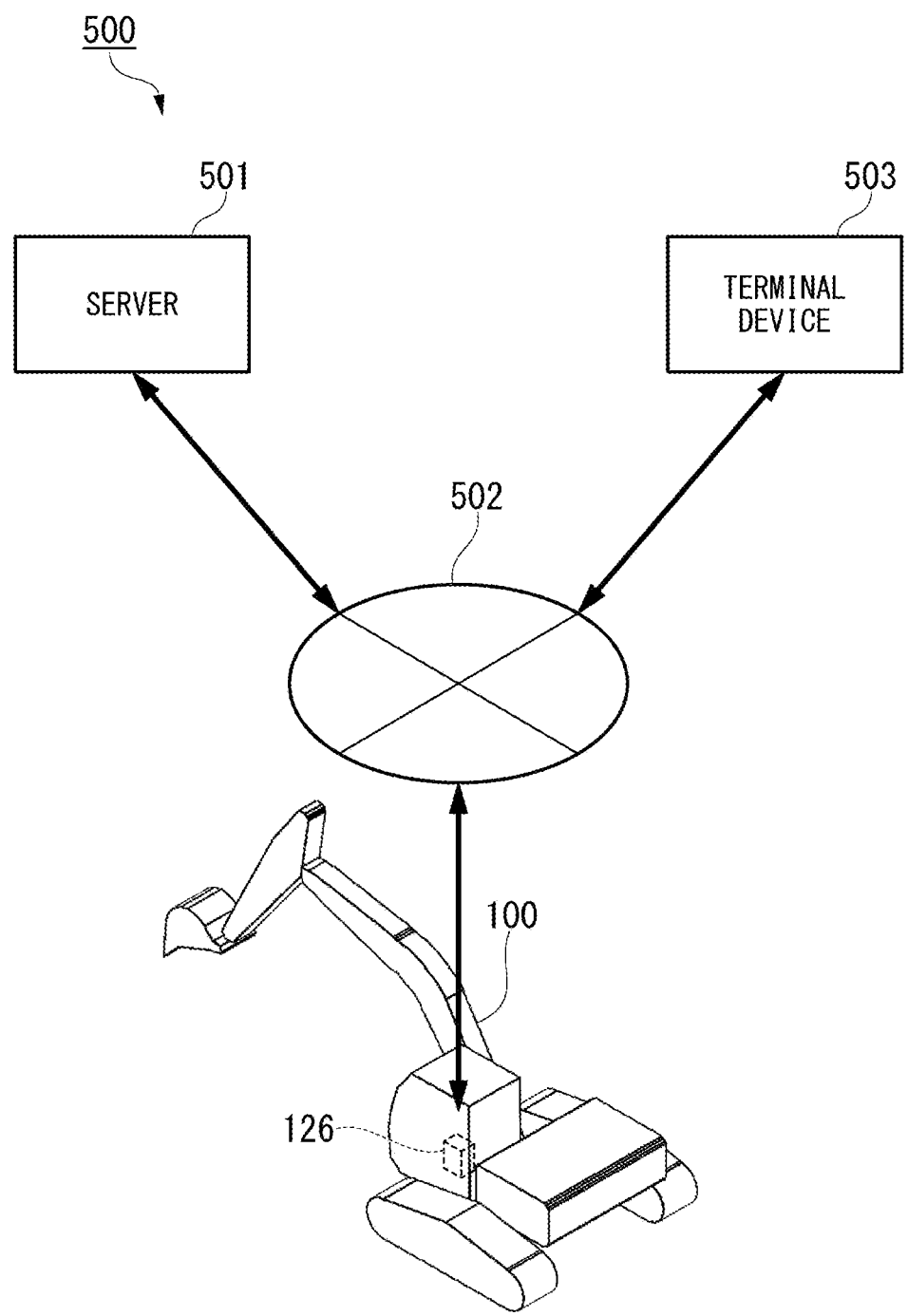
FIG. 23 is a schematic diagram representing a configuration of a position measurement system according to another embodiment.

The operator operates the input device 650 to instruct switching of the display screen of the display device 660. The display control unit 611 of the terminal device 503 outputs a display signal of a selection screen for selecting one GNSS reference station C from the plurality of GNSS reference stations C based on the information of the plurality of GNSS reference stations C stored in the reference station storage unit 631, to the display device 660 (Step S303). FIG. 22 is a diagram representing an example of the selection screen displayed in the terminal device according to the fourth embodiment. As represented in FIG. 22, on the selection screen, a list G21 representing positions relating to the plurality of GNSS reference stations C and heights (height h in FIG. 9) from positions relating to the GNSS reference stations C to the center of the figure on the external target Tg is included.

The operator operates the input device 650 to select the GNSS reference station C used for the parameter check from the displayed list G21 (Step S304). Thus, the reference station selection unit 612 of the terminal device 503 receives the selection of the GNSS reference station C. When the reference station selection unit 612 receives the selection of the GNSS reference station C, the command transmission unit 613 transmits the information regarding the selected GNSS reference station C to the control device 126 (Step S305). At this time, the control device 126 or the terminal device 503 determines whether or not the distance between the selected GNSS reference station C and the hydraulic excavator 100 is within a predetermined range for parameter check. When the distance between the selected GNSS reference station C and the hydraulic excavator 100 is within the predetermined range, the control device 126 proceeds the parameter check process. When the distance between the selected GNSS reference station C and the hydraulic excavator 100 is out of the predetermined range, the terminal device 503 outputs a display signal for displaying a screen instructing the operator to reset the GNSS reference station C, to the display device 660.

The operator operates the operation device 1211 such that the swing body 120 comes to any position, for example, each of the positions p101 to p103 represented in FIG. 14 and swings the swing body 120.

When the operator moves the swing body 120 to each of the positions p101 to p103, the operator operates the operation device 1211 and outputs an imaging command to the stereo camera 125 (Step S306). Thus, the imaging data acquisition unit 200 of the control device 126 acquires an image obtained by imaging of each camera of the stereo camera 125 at each position (positions p101 to p103), and obtains the center position of the external target Tg in the captured image (Step S307). That is, the imaging data acquisition unit 200 specifies the position of the external target Tg in the vehicle body coordinate system by the stereo measurement. For example, the imaging data acquisition unit 200 uses the external parameters (matrices Rcy, Rep, Rcr, and Tc in Expression (1)) stored in the parameter storage unit 204 to specify the position of the external target Tg in the camera coordinate system. Then, the imaging data acquisition unit 200 transforms the specified position into the position of the external target Tg in the vehicle body coordinate system by using the vehicle body parameters (matrices Rmy, Rmp, Rmr, and Tm in Expression (3)).

Every time the control device 126 obtains the center position of the external target Tg, the control device 126 transmits, to the terminal device 503, a display command of a screen for instructing imaging in the next posture. When the control device 126 fails to calculate the center position of the external target Tg, the control device 126 transmits, to the terminal device 503, a display command of a screen for instructing imaging again.

The control device 126 acquires the position of the external target Tg in the vehicle body coordinate system based on the information of the GNSS reference station C, which is received by the external target position acquisition unit 207 in Step S305 and the transformation parameter between the site coordinate system and the vehicle body coordinate system, which is calculated for each position when the transformation parameter calculation unit 205 performs imaging (Step S308). The position of the external target Tg in the vehicle body coordinate system, which is acquired in Step S308 is a known position of the external target Tg.

The parameter check unit 210 determines whether or not the difference between the position of the external target Tg which is stereo-measured in Step S307 and the known position of the external target Tg, which is acquired in Step S308 is within an allowable error range (Step S309). That is, the parameter check unit 210 determines whether the deviation between the stereo-measured position of the external target Tg and the known position of the external target Tg is within the allowable error range.

When the difference between the stereo-measured position of the external target Tg and the known position of the external target Tg is within the allowable error range (Step S309: YES), the parameter check unit 210 transmits check result information indicating that calibration of the parameter is not required, to the terminal device 503 (Step S310).

When the difference between the stereo-measured position of the external target Tg and the known position of the external target Tg is larger than the allowable error range (Step S309: NO), the parameter check unit 210 transmits check result information indicating that calibration of the parameter is required, to the terminal device 503 (Step S311). When the check result receiving unit 615 of the terminal device 503 receives the check result information from the control device 126, the display control unit 611 outputs a display signal of a check result screen displaying the check result information, to the display device 660 (Step S312).

When the parameter check unit 210 determines that the calibration is required, the second calibration unit 209 performs stereo measurement on a stereo image which is obtained by imaging of the paired cameras of the stereo camera 125 and is acquired in Step S307 for each changed pitch angle $\theta p$ while changing the pitch angle ($\theta p$ in Expression (1)) of the external parameter stored in the parameter storage unit 204 by a small angle. Then, the second calibration unit calculates a stereo ratio of the stereo image. The stereo ratio refers to a ratio of pixels for which stereo measurement is successful, among a plurality of pixels in a stereo image that is to be stereo-measured. Specifically, for each pixel of one image of the stereo image, the second calibration unit 209 searches for a corresponding point from a plurality of pixels existing on an epipolar line of the other image. Then, the second calibration unit calculates the stereo ratio by dividing the number of corresponding points by the number of pixels. The success or failure of the search for the corresponding point is greatly affected by the deviation of the pitch angle θp of the paired cameras. The second calibration unit 209 rewrites the pitch angle θp stored in the parameter storage unit 204 to the pitch angle θp that causes the obtained stereo ratio to be maximized among the pitch angles that are changed by a small angle (Step S313).

Then, the second calibration unit 209 calibrates the yaw angle θy being the external parameter stored in the parameter storage unit 204 based on the known position of the external target Tg in the vehicle body coordinate system, which is acquired in Step S308 and the position of the external target Tg which is stereo-measured in Step S307 (Step S314). That is, the second calibration unit 209 calibrates the yaw angle θy such that the difference in distance between the camera and the external target Tg is minimized. The yaw angle θy is a parameter that affects the distance (scale) from the stereo camera 125 to the imaging target.

The second calibration unit 209 obtains the vehicle body parameters (matrices Rmy, Rmp, Rmr, and Tm forming Expression (3)) such that the position of the external target Tg obtained by the calculation coincides with the position acquired in Step S314 (Step S315). For example, the second calibration unit 209 obtains the matrices Rmy, Rmp, Rmr, and Tm by the process described below. Firstly, the second calibration unit 209 specifies the position of a pixel (first pixel) in which the external target Tg appears in the image actually imaged by one camera (for example, first camera 1251) in accordance with each posture. Then, the second calibration unit 209 uses the known selected position of the external target Tg, the position and posture information of the hydraulic excavator 100 at the time of imaging, and the vehicle body parameter for one camera, which is stored in the parameter storage unit 204 to calculate and specify the position of a pixel (second pixel) in which the external target Tg is projected onto the pixel of one camera in each posture, by simulation. Then, the second calibration unit 209 compares the position of the first pixel of the external target Tg which is actually imaged and the position of the second pixel of the external target Tg specified by simulation to each other and performs the convergence calculation such that the error is minimized. Thus, the vehicle body parameter is calibrated. In this case, the second calibration unit 209 is an example of a first pixel acquisition unit and a second pixel acquisition unit.

As a result of the calibration process of Steps S313 to S315, the second calibration unit 209 determines whether or not the difference between the calculated position of the external target Tg and the position of the external target Tg, which is specified by the stereo measurement in Step S308 is within the allowable error range (Step S316). When the difference between the calculated position of the external target Tg and the position of the external target Tg, which is specified by the stereo measurement in Step S308 is within the allowable error range (Step S316: YES), the second calibration unit 209 transmits, to the terminal device 503, calibration result information indicating that calibration of the parameter is successful (Step S317). When the difference between the calculated position of the external target Tg and the position of the external target Tg, which is specified in Step S313 exceeds the allowable error range (Step S316: NO), the second calibration unit 209 transmits, to the terminal device 503, calibration result information indicating that calibration of the parameter has failed (Step S318). When the calibration result receiving unit 616 of the terminal device 503 receives the calibration result information from the control device 126, the display control unit 611 outputs a display signal of a calibration result screen for displaying the calibration result information, to the display device 660 (Step S319).

As described above, according to the fourth embodiment, the operator can easily check whether or not calibration of the stereo camera 125 is required, before daily work. Thus, it is possible to prevent the decrease of work efficiency of the operator while appropriately maintaining the parameters of the stereo camera 125.

According to the fourth embodiment, the terminal device 503 assists the parameter check and the calibration process. Thus, the operator can easily perform the parameter check and the calibration process.

The control device 126 according to the fourth embodiment calibrates the pitch angle and yaw angle of the external parameters, and then calibrates the vehicle body parameters (matrices Rmy, Rmp, Rmr, and Tm). However, the invention is not limited thereto. For example, the control device 126 according to another embodiment may perform only the calibration of the pitch angle and the yaw angle, or may perform only the calibration of the vehicle body parameter. The control device 126 may calibrate the vehicle body parameter, and then calibrate the pitch angle and the yaw angle. The control device 126 according to another embodiment may calibrate the vehicle body parameters for each camera in the stereo camera 125.

Regarding three relative positions between the stereo camera 125 and the external target Tg, the control device 126 according to the fourth embodiment acquires the captured image for each relative position by swinging the hydraulic excavator 100. However, the invention is not limited thereto. For example, in other embodiments, captured images may be acquired for one or two, or four or more relative positions.

The control device 126 according to the fourth embodiment performs the parameter check and calibration of the stereo camera after performing the calibration process according to any of the first to third embodiments. However, the invention is not limited thereto. For example, the control device 126 according to another embodiment may perform the above-described parameter check and calibration of the stereo camera instead of the calibration process according to any of the first to third embodiments. In this case, the control device 126 does not necessarily include the first calibration unit 203.

In the fourth embodiment, the positions of the plurality of external targets Tg are obtained by changing the imaging position or the posture of the hydraulic excavator 100 as represented in FIG. 14, but the present invention is not limited thereto. For example, in another embodiment, as represented in FIG. 8, the hydraulic excavator 100 may obtain the positions of the plurality of external targets Tg by imaging the plurality of external targets Tg at one imaging position and posture. In this case, the position of each external target Tg represented in FIG. 8 needs to be known.

In the fourth embodiment, the control device 126 performs the processes of Step S307, Step S309, and steps S313 to S315, but the present invention is not limited thereto. For example, the processes may be performed by the terminal device 503 or a server 501 described later. Some or all of the components of the control device 126 may be provided in the terminal device 503 or the server 501 described later, and the terminal device 503 or the server 501 may perform some or all of the processes. The control device 126 itself may be provided in the terminal device 503 or the server 501.

In the fourth embodiment, the communication unit 211 outputs the check result of the parameter check unit 210 to the terminal device 503, but the present invention is not limited thereto. For example, in another embodiment, the communication unit 211 may output the check result to the second calibration unit 209, and the second calibration unit 209 that receives the check result may automatically calibrate the external parameter or the vehicle body parameter. That is, in another embodiment, the terminal device 503 does not necessarily display the check result. When the server 501 described later performs the calibration process of Steps S323 to S326, the communication unit 211 may output the check result to the server device 501, and the server device 501 that receives the result may calibrate the external parameter or the vehicle body parameter.

OTHER EMBODIMENTS

Hitherto, although the embodiment has been described in detail above with reference to the drawings, the specific configuration is not limited to the above description, and various design changes and the like can be made.

For example, according to the first embodiment, the external target Tg is imaged after the work equipment target Tm is imaged, but the invention is not limited thereto. For example, the control device 126 according to another embodiment may image the work equipment target Tm after imaging the external target Tg, or may simultaneously image the work equipment target Tm and the external target Tg by capturing both the work equipment target Tm and the external target Tg in one image.

In the above-described embodiments, the case where the work machine is the hydraulic excavator 100 has been described, but the present invention is not limited thereto. For example, in another embodiment, a wheel loader or a bulldozer may include the stereo camera 125 to perform the above-described calibration.

In the above-described embodiments, the case where the control device 126 obtains the parameter shown in Expression (1) (so-called external parameter) and the parameter shown in Expression (3) has been described, but the present invention is not limited thereto. For example, the control device 126 may calibrate the stereo camera 125 by changing the internal parameter of each camera. Examples of internal parameters include the focal length of an optical system of the camera, the position (x, y) of an intersection point between an optical axis of the optical system of the camera and an imaging surface of an image sensor, and the distortion coefficient of a camera lens in a radial direction.

In the above-described embodiments, the external target Tg at the known point is installed on the GNSS reference station C at the construction site, but the present invention is not limited thereto. For example, in another embodiment, the position of the external target Tg in the site coordinate system may be known by installing the external target Tg near a GNSS antenna. For example, the external target Tg may be provided in another hydraulic excavator 100 and the other hydraulic excavator 100 transforms the position of the external target Tg into the position in the site coordinate system. In this manner, the position of the external target Tg in the site coordinate system may be known. The external target Tg does not necessarily be installed at the construction site. The external target Tg may be installed, for example, in a factory or a house.

In the above-described embodiments, the control device 126 transforms the position in the camera coordinate system and the site coordinate system into the position in the vehicle body coordinate system, and thereby specifying the positional relation between the stereo camera 125 and the work equipment target Tm or the external target Tg. However, the invention is not limited thereto. For example, in another embodiment, the positional relation between the stereo camera 125 and the work equipment target Tm or the external target Tg may be specified by transforming the position in the vehicle body coordinate system into the position in the camera coordinate system or the site coordinate system.

In the first and second embodiments, the control device 126 images the external target Tg at the known point once, and updates the parameters of the stereo camera 125 based on the captured image and the positional relation between the stereo camera 125 and the external target Tg at the known point at this time. However, the invention is not limited thereto. For example, in another embodiment, the control device 126 may image the external target Tg at the known point a plurality of times, and update the parameters of the stereo camera 125 based on each captured image and the positional relation between the stereo camera 125 and the external target Tg at the known point at each imaging timing. In this case, the above description can be realized by replacing the processes of Steps S6 to S11 in the flowchart represented in FIG. 12 or the processes of Steps S104 to S109 in the flowchart represented in FIG. 13 with Steps S201 to S206 in the flowchart represented in FIG. 15. By imaging the external target Tg at the known point a plurality of times, it is possible to reduce the influence of the error of a GNSS or an IMU, which is included in the calculation result of the positional relation between the stereo camera 125 and the external target Tg at the known point, and it is possible to obtain the parameters of the stereo camera 125 with higher accuracy.

FIG. 22 is a schematic diagram representing a configuration of the calibration system according to another embodiment.

In the above-described embodiments, the control device 126 independently calibrates the stereo camera 125, but the present invention is not limited thereto. For example, in another embodiment, when the calibration system 500 includes the hydraulic excavator 100, the server 501, a communication line 502, and the terminal device 503, the control device 126 may cooperate with other devices to calibrate the stereo camera 125. In the example represented in FIG. 22, the control device 126 can perform data communication with the server 501 and the terminal device 503 provided remotely from the hydraulic excavator 100 via the communication line 502. A computer system is an example of the server 501. Examples of the terminal device 503 include a personal computer and a portable terminal. Examples of the communication line 502 include the Internet, a local area network, a portable phone communication network, and a satellite communication network. The terminal device 503 may be provided in a remote operation room of the hydraulic excavator 100 (not represented).

In such an embodiment, the server 501 may have some or all of the functions of the control device 126. That is, the server 501 includes at least one of the imaging data acquisition unit 200, the work machine information storage unit 201, the work equipment position specifying unit 202, the first calibration unit 203, the parameter storage unit 204, the transformation parameter calculation unit 205, the external target position calculation unit 206, the external target position acquisition unit 207, the external target position transformation unit 208, and the second calibration unit 209. In this case, data detected by the position and azimuth direction calculator 123, the tilt detector 124, the stereo camera 125, and the work equipment position detector 117 is supplied to the server 501 via the communication line 502. For example, the server 501 receives the captured image and the position of each target in the site coordinate system from the control device 126 and performs the convergence calculation based on the received image and position, thereby calculating the camera parameters and transmitting the calculated parameters to the control device 126.

In such an embodiment, the terminal device 503 may have some or all of the functions of the control device 126. That is, the terminal device 503 includes at least one of the imaging data acquisition unit 200, the work machine information storage unit 201, the work equipment position specifying unit 202, the first calibration unit 203, the parameter storage unit 204, the transformation parameter calculation unit 205, the external target position calculation unit 206, the external target position acquisition unit 207, the external target position transformation unit 208, and the second calibration unit 209.

INDUSTRIAL APPLICABILITY

According to the above aspect, it is possible to calibrate an imaging device such that it is possible to perform calculation for an imaging target in a region farther than a work range of work equipment, with high accuracy.

REFERENCE SIGNS LIST

100 Hydraulic excavator
110 Work equipment
120 Swing body
125 Stereo camera
1251 First camera
1252 Second camera
1253 Third camera
1254 Fourth camera
126 Control device
200 Imaging data acquisition unit
201 Work machine information storage unit
202 Work equipment position specifying unit
203 First calibration unit
204 Parameter storage unit
205 Transformation parameter calculation unit
206 External target position calculation unit
207 External target position acquisition unit
208 External target position transformation unit
209 Second calibration unit
Tm Work equipment target
Tg External target

The invention claimed is:

1. A calibration device for an imaging device, the device comprising:
an imaging data acquisition unit that is configured to acquire imaging data of a known external target installed at a known position outside a work range of work equipment and imaging data of an unknown external target installed at an unknown position, the imaging data of the known external target and the imaging data of the unknown external target being obtained by imaging of at least one imaging device provided in a work machine including the work equipment;
an external target position acquisition unit that is configured to acquire a position of the known external target; and
a calibration unit that is configured to calibrate the imaging device based on the position of the known external target, which is acquired by the external target position acquisition unit, the imaging data of the known external target, which is acquired by the imaging data acquisition unit and a position of the unknown external target in an image being the imaging data acquired by the imaging data acquisition unit.

2. The calibration device for an imaging device according to claim 1,
wherein the imaging data acquisition unit acquires the imaging data of the known external target from at least one pair of imaging devices, and
the calibration unit calibrates the imaging device based on the position of the known external target, which is acquired by the external target position acquisition unit, and the position of the known external target, which is stereo-measured based on the imaging data of the known external target acquired by the imaging data acquisition unit.

3. The calibration device for an imaging device according to claim 2, further comprising:
a first positional relation specifying unit that is configured to specify a first positional relation being a positional relation between the imaging device and the known external target, based on a stereo-measurement result of the known external target; and
a second positional relation specifying unit that is configured to specify a second positional relation being a positional relation between the imaging device and the known external target, based on the position of the known external target, which is acquired by the external target position acquisition unit,
wherein the calibration unit calibrates the imaging device based on the first positional relation and the second positional relation.

4. The calibration device for an imaging device according to claim 3, further comprising:
a work equipment position specifying unit that is configured to specify a position of the work equipment and calculates a position of a work equipment target provided on the work equipment,
wherein the imaging data acquisition unit acquires imaging data of the work equipment target, which is obtained by imaging of the imaging device, and
the calibration unit performs calibration of the imaging device based on the imaging data of the work equipment target, which is acquired by the imaging data acquisition unit and the position of the work equipment target, which is calculated by the work equipment position specifying unit, and performs calibration of the imaging device based on the first positional relation and the second positional relation.

5. The calibration device for an imaging device according to claim 1,
wherein the calibration unit calibrates the imaging device based on the position of the known external target, which is acquired by the external target position acquisition unit, and the position of the known external target in an image being the imaging data of the known external target acquired by the imaging data acquisition unit.

6. The calibration device for an imaging device according to claim 5, further comprising:
a work equipment position specifying unit that is configured to specify a position of the work equipment and calculates a position of a work equipment target provided on the work equipment,
wherein the imaging data acquisition unit acquires imaging data of the work equipment target, which is obtained by imaging of the imaging device, and
the calibration unit calibrates the imaging device based on the imaging data of the work equipment target, which is acquired by the imaging data acquisition unit, the position of the work equipment target, which is calculated by the work equipment position specifying unit, the position of the known external target, which is acquired by the external target position acquisition unit, and the position of the known external target in an image obtained by imaging of the imaging device.

7. The calibration device for an imaging device according to claim 1,
wherein the imaging data acquisition unit acquires imaging data of a plurality of the known external targets, which is obtained by imaging of the imaging device,
the external target position acquisition unit acquires the position of each of the plurality of the known external targets, and
the calibration unit calibrates the imaging device based on the positions of the plurality of the known external targets, which are acquired by the external target position acquisition unit, and the imaging data of the plurality of the known external targets, which is acquired by the imaging data acquisition unit.

8. The calibration device for an imaging device according to claim 1,
wherein the imaging data acquisition unit acquires imaging data for each relative position of the imaging device and the known external target,
the external target position acquisition unit acquires the position of the known external target for each relative position, and
the calibration unit calibrates the imaging device based on the position of the known external target for each relative position, which is acquired by the external target position acquisition unit, and the imaging data of the known external target for each relative position, which is acquired by the imaging data acquisition unit.

9. The calibration device for an imaging device according to claim 1,
wherein the imaging data acquisition unit acquires imaging data of a known point target provided at a known position in the work range of the work equipment, and
the calibration unit calibrates the imaging device based on positions of the known external target and the known point target, and pieces of imaging data of the known external target and the known point target obtained by the imaging device.

10. The calibration device for an imaging device according to claim 1,
wherein the calibration unit calibrates parameters for defining an installation position and a posture of the imaging device in the work machine.

11. The calibration device for an imaging device according to claim 1, further comprising:
a parameter check unit that determines necessity of a calibration process of the imaging device, based on whether or not a difference between the position of the known external target, which is acquired by the external target position acquisition unit, and the imaging data of the known external target, which is acquired by the imaging data acquisition unit, is within an allowable error range; and
an output unit that outputs a determination result of the necessity of the calibration process,
wherein the calibration unit calibrates the imaging device when a determination result indicating that calibration of the imaging device is required is received, as a result of monitoring from the parameter check unit.

12. The calibration device for an imaging device according to claim 1, wherein
the calibration unit calibrates a vehicle body parameter of the imaging device based on the positions of the plurality of the known external targets, which are acquired by the external target position acquisition unit, and imaging data of the plurality of the known external targets, which is acquired by the imaging data acquisition unit.

13. The calibration device for an imaging device according to claim 1, further comprising:
a first pixel acquisition unit that is configured to acquire a position of a first pixel that is a pixel in which a plurality of the known external targets are captured in imaging data obtained by imaging of the imaging device; and
a second pixel acquisition unit that calculates a position of a second pixel that is a pixel in which the plurality of the known external targets are projected onto pixels of the imaging device, based on the positions of the plurality of the known external targets, which are acquired by the external target position acquisition unit and the vehicle body parameter of the imaging device, wherein
the calibration unit calibrates the vehicle body parameter based on the position of the first pixel and the position of the second pixel.

14. A work machine comprising:
work equipment; and
the calibration device for an imaging device according to claim 1.

15. A calibration method for an imaging device, the method comprising:
acquiring imaging data of a known external target installed at a known position outside a work range of work equipment and imaging data of an unknown external target installed at an unknown position, the imaging data of the known external target and the imaging data of the unknown external target being obtained by imaging of at least one imaging device provided in a work machine including the work equipment;
acquiring a position of the known external target; and
calibrating the imaging device based on the acquired position of the known external target, the imaging data of the known external target by the imaging device, and a position of the unknown external target in an image being the imaging data obtained by the imaging device.

* * * * *